(12) United States Patent
Liu et al.

(10) Patent No.: US 12,532,270 B2
(45) Date of Patent: Jan. 20, 2026

(54) POWER HEADROOM REPORTING METHOD, APPARATUS, AND SYSTEM

(71) Applicant: HUAWEI TECHNOLOGIES CO., LTD., Guangdong (CN)

(72) Inventors: Mengting Liu, Beijing (CN); Su Huang, Shanghai (CN); Yinghao Guo, Shanghai (CN); Junren Chang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 326 days.

(21) Appl. No.: 18/340,331

(22) Filed: Jun. 23, 2023

(65) Prior Publication Data

US 2023/0337150 A1 Oct. 19, 2023

Related U.S. Application Data

(63) Continuation of application No. PCT/CN2020/139070, filed on Dec. 24, 2020.

(51) Int. Cl.
*H04W 52/36* (2009.01)
*H04W 52/14* (2009.01)

(52) U.S. Cl.
CPC ....... *H04W 52/365* (2013.01); *H04W 52/146* (2013.01)

(58) Field of Classification Search
CPC ............. H04W 52/365; H04W 52/146; H04W 52/325; H04W 52/54; H04W 64/00
See application file for complete search history.

(56) References Cited

U.S. PATENT DOCUMENTS

| | | | | |
|---|---|---|---|---|
| 11,647,469 | B2 * | 5/2023 | Yang | H04W 80/02 370/318 |
| 2023/0262612 | A1 * | 8/2023 | Matsumura | H04W 52/365 455/522 |
| 2025/0151056 | A1 * | 5/2025 | Kim | H04L 27/2602 |

FOREIGN PATENT DOCUMENTS

| | | |
|---|---|---|
| CN | 111164906 A | 5/2020 |
| CN | 111278112 A | 6/2020 |

(Continued)

OTHER PUBLICATIONS

3GPP TSG RAN WG1 #100bis R1-2001686, Apr. 20-30, 2020, "Discussion on remaining issues on UL RS for NR positioning" (Year: 2020).*

(Continued)

*Primary Examiner* — Fayyaz Alam
(74) *Attorney, Agent, or Firm* — WOMBLE BOND DICKINSON (US) LLP

(57) ABSTRACT

Embodiments of this application provide a power headroom reporting method, an apparatus, and a system, to resolve a problem that a level mismatch currently exists between calculation of a Type 3 power headroom and reporting of the Type 3 power headroom. The method includes: A terminal device determines a power headroom corresponding to one or more reference signal resource sets in each of one or more cells, where the one or more cells are cells that are among cells participating in positioning of the terminal device and that require the terminal device to report the power headroom; and the terminal device sends power headroom information to a network device, where the power headroom information includes the power headroom corresponding to the one or more reference signal resource sets in each of the one or more cells.

20 Claims, 14 Drawing Sheets

| 7 | 6 | 5 | 4 | 3 | 2 | 1 | 0 |
|---|---|---|---|---|---|---|---|
| $C_7$ | $C_6$ | $C_5$ | $C_4$ | $C_3$ | $C_2$ | $C_1$ | R |
| P | V | \multicolumn{6}{c}{PH (type 2, SpCell of another MAC entity)} |
| MPE or R | | \multicolumn{6}{c}{$P_{CMAX,f,c}1$} |
| P | V | \multicolumn{6}{c}{PH (type 1, PCell)} |
| MPE or R | | \multicolumn{6}{c}{$P_{CMAX,f,c}2$} |
| P | V | \multicolumn{6}{c}{PH (type X, serving cell 1)} |
| MPE or R | | \multicolumn{6}{c}{$P_{CMAX,f,c}3$} |

...

| | | |
|---|---|---|
| P | V | PH (type X, serving cell n) |
| MPE or R | | $P_{CMAX,f,c}m$ |

...

(56) References Cited

FOREIGN PATENT DOCUMENTS

CN          111641961 A      9/2020
WO          2020168296 A1    8/2020

OTHER PUBLICATIONS

3rd Generation Partnership Project; Technical Specification Group Radio Access Network; NR; Medium Access Control (MAC) protocol specification (Release 16), 3GPP TS 38.321 V16.2.1 (Sep. 2020), Technical Specification, total 154 pages.

3rd Generation Partnership Project; Technical Specification Group Radio Access Network; NR; Medium Access Control (MAC) protocol specification (Release 16), 3GPP TS 38.321 V16.0.0 (Mar. 2020), Technical Specification, total 141 pages.

3rd Generation Partnership Project; Technical Specification Group Radio Access Network; NR; Physical layer procedures for control (Release 16), 3GPP TS 38.321 V16.2.0 (Jun. 2020), Technical Specification, total 176 pages.

3rd Generation Partnership Project; Technical Specification Group Radio Access Network; Study on NR coverage enhancements, (Release 17), 3GPP TR 38.830 V0.0.2 (Aug. 2020), Technical Report, total 18 pages.

3GPP TSG RAN WG1 #100bis R1-2001686,"Discussion on remaining issues on UL RS for NR positioning",vivo, vol. RAN WG1, No. e-Meeting:Apr. 20, 2020-Apr. 30, 2020, Apr. 10, 2020(Apr. 10, 2020), XP052341770, total 12 pages.

\* cited by examiner

| | 7 | 6 | 5 | 4 | 3 | 2 | 1 | 0 |
|---|---|---|---|---|---|---|---|---|
| | $C_7$ | $C_6$ | $C_5$ | $C_4$ | $C_3$ | $C_2$ | $C_1$ | R |
| | P | V | PH (type 2, SpCell of another MAC entity) ||||||
| | MPE or R | | $P_{CMAX,f,c}1$ |||||||
| | P | V | PH (type 1, PCell) ||||||
| | MPE or R | | $P_{CMAX,f,c}2$ |||||||
| | P | V | PH (type X, serving cell 1) ||||||
| | MPE or R | | $P_{CMAX,f,c}3$ |||||||

...

| | P | V | PH (type X, serving cell n) |
|---|---|---|---|
| | MPE or R | | $P_{CMAX,f,c}m$ |

| 7 | 6 | 5 | 4 | 3 | 2 | 1 | 0 |
|---|---|---|---|---|---|---|---|
| $C_7$ | $C_6$ | $C_5$ | $C_4$ | $C_3$ | $C_2$ | $C_1$ | R |
| $C_{15}$ | $C_{14}$ | $C_{13}$ | $C_{12}$ | $C_{11}$ | $C_{10}$ | $C_9$ | $C_8$ |
| $C_{23}$ | $C_{22}$ | $C_{21}$ | $C_{20}$ | $C_{19}$ | $C_{18}$ | $C_{17}$ | $C_{16}$ |
| $C_{31}$ | $C_{30}$ | $C_{29}$ | $C_{28}$ | $C_{27}$ | $C_{26}$ | $C_{25}$ | $C_{24}$ |
| P | V | PH (type 2, sPCell of another MAC entity) | | | | | |
| MPE or R | | $P_{CMAX,f,c}1$ | | | | | |
| P | V | PH (type 1, PCell) | | | | | |
| MPE or R | | $P_{CMAX,f,c}2$ | | | | | |
| P | V | PH (type X, serving cell 1) | | | | | |
| MPE or R | | $P_{CMAX,f,c}3$ | | | | | |

...

| | | |
|---|---|---|
| P | V | PH (type X, serving cell n) |
| MPE or R | | $P_{CMAX,f,c}m$ |

| 7 | 6 | 5 | 4 | 3 | 2 | 1 | 0 |
|---|---|---|---|---|---|---|---|
| 0 | 0 | 0 | 0 | 1 | 0 | 1 | 1 |
| 0 | 0 | 0 | 0 | 0 | 0 | 1 | 1 |
| 0 | 0 | 0 | 0 | 0 | 0 | 0 | 0 |
| 0 | 0 | 0 | 0 | 0 | 0 | 0 | 1 |
| 0 | 0 | 0 | 0 | 0 | 0 | 0 | 0 |
| 0 | 0 | 0 | 0 | 0 | 0 | 1 | 1 |
| 0 | 0 | 0 | 0 | 0 | 0 | 0 | 0 |
| P | V | colspan=6: PH (type 2, sPCell of another MAC entity) |
| MPE or R | colspan=7: $P_{CMAX,f,c}1$ |
| P | V | colspan=6: PH (type 1, PCell) |
| MPE or R | colspan=7: $P_{CMAX,f,c}2$ |
| P | V | colspan=6: PH (type 3, PCell, reference signal resource set 1) |
| P | V | colspan=6: PH (type 3, PCell, reference signal resource set 2) |
| MPE or R | colspan=7: $P_{CMAX,f,c}3$ |
| P | V | colspan=6: PH (type 3, serving cell 1, reference signal resource set 1) |
| MPE or R | colspan=7: $P_{CMAX,f,c}4$ |
| P | V | colspan=6: PH (type 3, serving cell 3, reference signal resource set t 1) |
| P | V | colspan=6: PH (type 3, serving cell 3, reference signal resource set 2) |
| MPE or R | colspan=7: $P_{CMAX,f,c}5$ |

FIG. 10

POWER HEADROOM REPORTING METHOD, APPARATUS, AND SYSTEM

CROSS-REFERENCE TO RELATED APPLICATIONS

This application is a continuation of International Application No. PCT/CN2020/139070, filed on Dec. 24, 2020, the disclosure of which is hereby incorporated by reference in its entirety.

TECHNICAL FIELD

This application relates to the field of communication, and in particular, to a power headroom reporting method, an apparatus, and a system.

BACKGROUND

Uplink power control is to control and adjust uplink transmit power of a terminal device. Uplink power control in a wireless communication system is very important. The uplink transmit power of the terminal device is appropriately adjusted, so that the transmit power of the terminal device can be reduced as much as possible under a condition of ensuring received signal quality on a receive side, thereby prolonging a battery life of the terminal device. In addition, uplink interference to another terminal device in the system can be minimized.

Based on the significance of uplink power control mentioned above, most companies have already supported uplink power control at the 3rd generation partnership project (3GPP) Technical Specification Group (TSG) radio access network working group 1 (RAN1) meeting #102-e of release 17 (reversion17, R17).

Currently, power headroom types used for uplink power include a type 1 (Type 1) power headroom, a type 2 (Type 2) power headroom, and a type 3 (Type 3) power headroom. However, in a current standard related to uplink power, calculation of the Type 3 power headroom is at a sounding reference signal (SRS) resource set level, but reporting of the Type 3 power headroom is at an uplink (UL) carrier level (which may also be understood as a cell level). It is clear that there is a level mismatch between the calculation of the Type 3 power headroom and the reporting of the Type 3 power headroom.

SUMMARY

Embodiments of this application provide a power headroom reporting method, an apparatus, and a system, to resolve a problem that a level mismatch currently exists between calculation of a Type 3 power headroom and reporting of the Type 3 power headroom.

To achieve the foregoing objectives, embodiments of this application use the following technical solutions:

In some embodiments, a power control method is provided. A communication apparatus for performing the power control method may be a terminal device, or may be a module applied to a terminal device, for example, a chip or a chip system. The following uses an example in which an execution body is a terminal device for description. The terminal device determines a power headroom corresponding to one or more reference signal resource sets in each of one or more cells, where the one or more cells are cells that are among cells participating in positioning of the terminal device and that require the terminal device to report the power headroom. The terminal device sends power headroom information to a network device, where the power headroom information includes the power headroom corresponding to the one or more reference signal resource sets in each of the one or more cells. Based on the power headroom reporting method provided in this embodiment of this application, power headroom information sent by the terminal device to the network device includes a power headroom corresponding to one or more reference signal resource sets in each of one or more cells. It can be concluded that the power headroom reported by the terminal device to the network device includes a power headroom at a reference signal resource set level. However, in a current standard related to uplink power, the calculation of the Type 3 power headroom is at a reference signal resource set level. Therefore, a reporting level of the power headroom provided in embodiments of this application matches a calculation level the Type 3 power headroom. Therefore, a problem in current technologies that the calculation level of the Type 3 power headroom does not match the reporting level of the Type 3 power headroom can be avoided.

In some embodiments, the power headroom information further includes first indication information, where the first indication information indicates whether the terminal device reports a power headroom at a reference signal resource set level of a first cell, and the first cell is a cell used by the terminal device to initiate initial access. In other words, in this embodiment of this application, the terminal device may use the power headroom information to indicate whether the terminal device reports a power headroom at a reference signal resource set level of a first cell.

In some embodiments, the power headroom information further includes second indication information, where the second indication information indicates whether the power headroom information includes the power headroom corresponding to each reference signal resource set in each of the one or more cells. In other words, in this embodiment of this application, the terminal device may use the power headroom information to indicate whether the terminal device reports the power headroom corresponding to each reference signal resource set in each of the one or more cells.

In some embodiments, the power headroom information further includes third indication information, where the third indication information indicates whether the terminal device reports a power headroom at a reference signal resource set level. In other words, in this embodiment of this application, the terminal device may use the power headroom information to indicate whether the terminal device reports the power headroom at the reference signal resource set level.

In some embodiments, the method further includes: The terminal device receives fourth indication information, where the fourth indication information indicates the one or more reference signal resource sets in each of the one or more cells that require the terminal device to report the power headrooms. In other words, in this embodiment of this application, the one or more reference signal resource sets in each of the one or more cells that require the terminal device to report the power headroom may be indicated by a network side, so that the terminal device can report the power headroom at the reference signal resource set level as required.

In some embodiments, the fourth indication information includes an identifier of the one or more cells and an identifier of the one or more reference signal resource sets in each of the one or more cells.

In some embodiments, that the terminal device receives the fourth indication information includes: the terminal device receives the fourth indication information from a positioning management device or the network device. In other words, in this embodiment of this application, the fourth indication information may be indicated by the positioning management device, or may be indicated by the network device. This is not limited in this embodiment of this application.

In some embodiments, the power headroom corresponding to the one or more reference signal resource sets is a power headroom of a first power headroom type, where the first power headroom type is a Type 3. In other words, an existing Type 3 power headroom type may be reused in this embodiment of this application.

In some embodiments, the power headroom corresponding to the one or more reference signal resource sets is a power headroom of a second power headroom type, where the second power headroom type is a power headroom type at a reference signal resource set level. In other words, a new power headroom type may be defined in this embodiment of this application.

In some embodiments, the power headroom information further includes the power headroom corresponding to each of the one or more cells, where the power headroom corresponding to each of the one or more cells is a power headroom of a first power headroom type, and the first power headroom type is a Type 3. In other words, in this embodiment of this application, the terminal device may use the power headroom information to indicate a power headroom at the reference signal resource set level and a power headroom at a cell level.

In some embodiments, the power headroom information further includes $P_{CMAX}$ corresponding to each of the one or more cells. $P_{CMAX}$ represents maximum transmit power at which the terminal device sends a reference signal on a current carrier of each of the one or more cells. In other words, in this embodiment of this application, the terminal device may use the power headroom information to indicate $P_{CMAX}$ corresponding to each of the one or more cells.

In some embodiments, that the terminal device sends the power headroom information to the network device includes: the terminal device sends a medium access control (MAC) control element (CE) to the network device, where the MAC CE includes the power headroom information, and the power headroom information includes the power headroom corresponding to the one or more reference signal resource sets in each of the one or more cells. In other words, in this embodiment of this application, the power headroom information may be carried by the MAC CE.

In some embodiments, a power control method is provided. A communication apparatus for performing the power control method may be a network device, or may be a module applied to a network device, for example, a chip or a chip system. The following uses an example in which an execution body is a network device for description. The network device receives power headroom information from a terminal device, where the power headroom information includes a power headroom corresponding to one or more reference signal resource sets in each of one or more cells, and the one or more cells are cells that are among cells participating in positioning of the terminal device and that require the terminal device to report the power headroom. The network device determines an adjustment value of uplink transmit power of the terminal device based on the power headroom information. Based on the power headroom reporting method provided in this embodiment of this application, power headroom information sent by the terminal device to the network device includes a power headroom corresponding to one or more reference signal resource sets in each of one or more cells. It can be concluded that the power headroom reported by the terminal device to the network device includes a power headroom at a reference signal resource set level. However, in a current standard related to uplink power, the calculation of the Type 3 power headroom is at a reference signal resource set level. Therefore, a reporting level of the power headroom provided in embodiments of this application matches a calculation level the Type 3 power headroom. Therefore, a problem in current technologies that the calculation level of the Type 3 power headroom does not match the reporting level of the Type 3 power headroom can be avoided.

In some embodiments, the power headroom information further includes first indication information, where the first indication information indicates whether the terminal device reports a power headroom at a reference signal resource set level of a first cell, and the first cell is a cell used by the terminal device to initiate initial access. In other words, in this embodiment of this application, the terminal device may use the power headroom information to indicate whether the terminal device reports a power headroom at a reference signal resource set level of a first cell.

In some embodiments, the power headroom information further includes second indication information, where the second indication information indicates whether the power headroom information includes the power headroom corresponding to each reference signal resource set in each of the one or more cells. In other words, in this embodiment of this application, the terminal device may use the power headroom information to indicate whether the terminal device reports the power headroom corresponding to each reference signal resource set in each of the one or more cells.

In some embodiments, the power headroom information further includes third indication information, where the third indication information indicates whether the terminal device reports a power headroom at a reference signal resource set level. In other words, in this embodiment of this application, the terminal device may use the power headroom information to indicate whether the terminal device reports the power headroom at the reference signal resource set level.

In some embodiments, the method further includes: The network device sends fourth indication information to the terminal device, where the fourth indication information indicates the one or more reference signal resource sets in each of the one or more cells that require the terminal device to report the power headrooms. In other words, in this embodiment of this application, the one or more reference signal resource sets in each of the one or more cells that require the terminal device to report the power headroom may be indicated by the network device, so that the terminal device can report the power headroom at the reference signal resource set level as required.

In some embodiments, the fourth indication information includes an identifier of the one or more cells and an identifier of the one or more reference signal resource sets in each of the one or more cells.

In some embodiments, the power headroom corresponding to the one or more reference signal resource sets is a power headroom of a first power headroom type, where the first power headroom type is a Type 3. In other words, an existing Type 3 power headroom type may be reused in this embodiment of this application.

In some embodiments, the power headroom corresponding to the one or more reference signal resource sets is a power headroom of a second power headroom type, where the second power headroom type is a power headroom type at a reference signal resource set level. In other words, a new power headroom type may be defined in this embodiment of this application.

In some embodiments, the power headroom information further includes the power headroom corresponding to each of the one or more cells, where the power headroom corresponding to each of the one or more cells is a power headroom of a first power headroom type, and the first power headroom type is a Type 3. In other words, in this embodiment of this application, the terminal device may use the power headroom information to indicate a power headroom at the reference signal resource set level and a power headroom at a cell level.

In some embodiments, the power headroom information further includes $P_{CMAX}$ corresponding to each of the one or more cells. $P_{CMAX}$ represents maximum transmit power at which the terminal device sends a reference signal on a current carrier of each of the one or more cells. In other words, in this embodiment of this application, the terminal device may use the power headroom information to indicate $P_{CMAX}$ corresponding to each of the one or more cells.

In some embodiments, that the network device receives the power headroom information from the terminal device includes: The network device receives a medium access control (MAC) control element (CE) from the terminal device, where the MAC CE includes the power headroom information, and the power headroom information includes the power headroom corresponding to the one or more reference signal resource sets in each of the one or more cells. In other words, in this embodiment of this application, the power headroom information may be carried by the MAC CE.

In some embodiments, a communication apparatus is provided, configured to perform the method in any one of the embodiments discussed herein. The communication apparatus may be the terminal device in any one of the embodiments discussed herein, or a module applied to the terminal device, for example, a chip or a chip system. The communication apparatus includes corresponding modules, units, or means for implementing the foregoing method. The modules, units, or means may be implemented by hardware, implemented by software, or implemented by hardware executing corresponding software. The hardware or software includes one or more modules or units corresponding to the foregoing functions.

In some embodiments, the communication apparatus includes: a processing module and a transceiver module, where the processing module is configured to determine power headroom corresponding to one or more reference signal resource sets in each of one or more cells, where the one or more cells are cells that are among cells participating in positioning of the terminal device and that require the terminal device to report the power headroom; and the transceiver module is configured to send power headroom information to a network device, where the power headroom information includes the power headroom corresponding to the one or more reference signal resource sets in each of the one or more cells.

In some embodiments, the power headroom information further includes first indication information, where the first indication information indicates whether the terminal device reports a power headroom at a reference signal resource set level of a first cell, and the first cell is a cell used by the terminal device to initiate initial access.

In some embodiments, the power headroom information further includes second indication information, where the second indication information indicates whether the power headroom information includes the power headroom corresponding to each reference signal resource set in each of the one or more cells.

In some embodiments, the power headroom information further includes third indication information, where the third indication information indicates whether the terminal device reports a power headroom at a reference signal resource set level.

In some embodiments, the transceiver module is further configured to receive fourth indication information, where the fourth indication information indicates the one or more reference signal resource sets in each of the one or more cells that require the terminal device to report the power headrooms.

In some embodiments, the fourth indication information includes an identifier of the one or more cells and an identifier of the one or more reference signal resource sets in each of the one or more cells.

In some embodiments, that the transceiver module is configured to receive the fourth indication information includes: the transceiver module is configured to receive the fourth indication information from a positioning management device or a network device.

In some embodiments, the power headroom corresponding to the one or more reference signal resource sets is a power headroom of a first power headroom type, where the first power headroom type is a Type 3.

In some embodiments, the power headroom corresponding to the one or more reference signal resource sets is a power headroom of a second power headroom type, where the second power headroom type is a power headroom type at a reference signal resource set level.

In some embodiments, the power headroom information further includes the power headroom corresponding to each of the one or more cells, where the power headroom corresponding to each of the one or more cells is a power headroom of a first power headroom type, and the first power headroom type is a Type 3.

In some embodiments, the power headroom information further includes $P_{CMAX}$ corresponding to each of the one or more cells. $P_{CMAX}$ represents maximum transmit power at which the terminal device sends a reference signal on a current carrier of each of the one or more cells.

In some embodiments, that the transceiver module is configured to send the power headroom information to the network device includes: the transceiver module is configured to send a medium access control MAC control element CE to the network device, where the MAC CE includes the power headroom information, and the power headroom information includes the power headroom corresponding to the one or more reference signal resource sets in each of the one or more cells.

In some embodiments, a communication apparatus is provided, configured to perform the method in any one of the embodiments discussed herein. The communication apparatus may be the terminal device in any one of the embodiments discussed herein, or a module applied to the terminal device, for example, a chip or a chip system. The communication apparatus includes corresponding modules, units, or means for implementing the foregoing method. The modules, units, or means may be implemented by hardware, implemented by software, or implemented by hardware executing corresponding software. The hardware or software includes one or more modules or units corresponding to the foregoing functions.

In some embodiments, the communication apparatus includes: a processor and a transceiver, where the processor is configured to determine power headroom corresponding to one or more reference signal resource sets in each of one or more cells, where the one or more cells are cells that are among cells participating in positioning of the terminal device and that require the terminal device to report the power headroom; and the transceiver is configured to send power headroom information to a network device, where the power headroom information includes the power headroom corresponding to the one or more reference signal resource sets in each of the one or more cells.

In some embodiments, the power headroom information further includes first indication information, where the first indication information indicates whether the terminal device reports a power headroom at a reference signal resource set level of a first cell, and the first cell is a cell used by the terminal device to initiate initial access.

In some embodiments, the power headroom information further includes second indication information, where the second indication information indicates whether the power headroom information includes the power headroom corresponding to each reference signal resource set in each of the one or more cells.

In some embodiments, the power headroom information further includes third indication information, where the third indication information indicates whether the terminal device reports a power headroom at a reference signal resource set level.

In some embodiments, the transceiver is further configured to receive fourth indication information, where the fourth indication information indicates the one or more reference signal resource sets in each of the one or more cells that require the terminal device to report the power headrooms.

In some embodiments, the fourth indication information includes an identifier of the one or more cells and an identifier of the one or more reference signal resource sets in each of the one or more cells.

In some embodiments, that the transceiver is configured to receive the fourth indication information includes: the transceiver module is configured to receive the fourth indication information from a positioning management device or a network device.

In some embodiments, the power headroom corresponding to the one or more reference signal resource sets is a power headroom of a first power headroom type, where the first power headroom type is a Type 3.

In some embodiments, the power headroom corresponding to the one or more reference signal resource sets is a power headroom of a second power headroom type, where the second power headroom type is a power headroom type at a reference signal resource set level.

In some embodiments, the power headroom information further includes the power headroom corresponding to each of the one or more cells, where the power headroom corresponding to each of the one or more cells is a power headroom of a first power headroom type, and the first power headroom type is a Type 3.

In some embodiments, the power headroom information further includes $P_{CMAX}$ corresponding to each of the one or more cells. $P_{CMAX}$ represents maximum transmit power at which the terminal device sends a reference signal on a current carrier of each of the one or more cells.

In some embodiments, that the transceiver is configured to send the power headroom information to the network device includes: the transceiver module is configured to send a medium access control MAC control element CE to the network device, where the MAC CE includes the power headroom information, and the power headroom information includes the power headroom corresponding to the one or more reference signal resource sets in each of the one or more cells.

In some embodiments, a communication apparatus is provided, configured to perform the method in any one of the embodiments discussed herein. The communication apparatus may be the terminal device in any one of the embodiments discussed herein, or a module applied to the terminal device, for example, a chip or a chip system. The communication apparatus includes at least one processor, configured to perform the method in any one of the embodiments discussed herein.

For example, the communication apparatus further includes a memory, the memory is coupled to the at least one processor, and the processor is configured to perform the method in any one of the embodiments discussed herein.

In some embodiments, the memory is configured to store program instruction and data. The memory is coupled to the at least one processor, and the at least one processor may invoke and execute the program instruction stored in the memory, to perform the method in any one of the embodiments discussed herein.

For example, the communication apparatus further includes a communication interface, and the communication interface is configured for the communication apparatus to communicate with another device. When the communication apparatus is a positioning management device, the communication interface is a transceiver, an input/output interface, a circuit, or the like.

In some embodiments, the communication apparatus includes: at least one processor and a communication interface, configured to perform the method in any one of the embodiments discussed herein, including: the at least one processor uses the communication interface to communicate with an external device; and the at least one processor is configured to run a computer program, so that the communication apparatus performs the method in any one of the embodiments discussed herein. It may be understood that the external device may be an object other than the processor or an object other than the communication apparatus.

In some embodiments, the communication apparatus is a chip or a chip system. The communication interface may be an input/output interface, an interface circuit, an output circuit, an input circuit, a pin, a related circuit, or the like on the chip or the chip system. The processor may also be embodied as a processing circuit or a logic circuit.

In some embodiments, a computer-readable storage medium is provided. The computer-readable storage medium stores a computer program. When the computer program is executed by a communication apparatus, the communication apparatus is enabled to perform the method in any one of the embodiments discussed herein.

In some embodiments, a computer program product including instructions is provided. When the instructions are executed by a computer, a communication apparatus is enabled to perform the method in any one of the embodiments discussed herein.

In some embodiments, a communication apparatus is provided, configured to perform the method in any one of the embodiments discussed herein. The communication apparatus may be the network device in any one of the embodiments discussed herein, or a module applied to the network device, for example, a chip or a chip system. The communication apparatus includes corresponding modules, units, or means for implementing the foregoing method. The modules, units, or means may be implemented by hardware, implemented by software, or implemented by hardware executing a corresponding software. The hardware or software includes one or more modules or units corresponding to the foregoing functions.

In some embodiments, the communication apparatus includes: a transceiver module and a processing module, where the transceiver module is configured to receive power headroom information from a terminal device, where the power headroom information includes a power headroom corresponding to one or more reference signal resource sets in each of one or more cells, and the one or more cells are cells that are among cells participating in positioning of the terminal device and that require the terminal device to report the power headroom; and the processing module is configured to determine an adjustment value of uplink transmit power of the terminal device based on the power headroom information.

In some embodiments, the power headroom information further includes first indication information, where the first indication information indicates whether the terminal device reports a power headroom at a reference signal resource set level of a first cell, and the first cell is a cell used by the terminal device to initiate initial access.

In some embodiments, the power headroom information further includes second indication information, where the second indication information indicates whether the power headroom information includes the power headroom corresponding to each reference signal resource set in each of the one or more cells.

In some embodiments, the power headroom information further includes third indication information, where the third indication information indicates whether the terminal device reports a power headroom at a reference signal resource set level.

In some embodiments, the transceiver module is further configured to send fourth indication information to the terminal device, where the fourth indication information indicates the one or more reference signal resource sets in each of the one or more cells that require the terminal device to report the power headrooms.

In some embodiments, the fourth indication information includes an identifier of the one or more cells and an identifier of the one or more reference signal resource sets in each of the one or more cells.

In some embodiments, the power headroom corresponding to the one or more reference signal resource sets is a power headroom of a first power headroom type, where the first power headroom type is a Type 3.

In some embodiments, the power headroom corresponding to the one or more reference signal resource sets is a power headroom of a second power headroom type, where the second power headroom type is a power headroom type at a reference signal resource set level.

In some embodiments, the power headroom information further includes the power headroom corresponding to each of the one or more cells, where the power headroom corresponding to each of the one or more cells is a power headroom of a first power headroom type, and the first power headroom type is a Type 3.

In some embodiments, the power headroom information further includes $P_{CMAX}$ corresponding to each of the one or more cells. $P_{CMAX}$ represents maximum transmit power at which the terminal device sends a reference signal on a current carrier of each of the one or more cells.

In some embodiments, that the transceiver module is configured to receive the power headroom information from the terminal device includes: the transceiver module is configured to receive a medium access control MAC control element CE from the terminal device, where the MAC CE includes the power headroom information, and the power headroom information includes the power headroom corresponding to the one or more reference signal resource sets in each of the one or more cells.

In some embodiments, a communication apparatus is provided, configured to perform the method in any one of the embodiments discussed herein. The communication apparatus may be the network device in any one of the embodiments discussed herein, or a module applied to the network device, for example, a chip or a chip system. The communication apparatus includes corresponding modules, units, or means for implementing the foregoing method. The modules, units, or means may be implemented by hardware, implemented by software, or implemented by hardware executing corresponding software. The hardware or software includes one or more modules or units corresponding to the foregoing functions.

In some embodiments, the communication apparatus includes: a transceiver and a processor, where the transceiver is configured to receive power headroom information from a terminal device, where the power headroom information includes a power headroom corresponding to one or more reference signal resource sets in each of one or more cells, and the one or more cells are cells that are among cells participating in positioning of the terminal device and that require the terminal device to report the power headroom; and the processor is configured to determine an adjustment value of uplink transmit power of the terminal device based on the power headroom information.

In some embodiments, the power headroom information further includes first indication information, where the first indication information indicates whether the terminal device reports a power headroom at a reference signal resource set level of a first cell, and the first cell is a cell used by the terminal device to initiate initial access.

In some embodiments, the power headroom information further includes second indication information, where the second indication information indicates whether the power headroom information includes the power headroom corresponding to each reference signal resource set in each of the one or more cells.

In some embodiments, the power headroom information further includes third indication information, where the third indication information indicates whether the terminal device reports a power headroom at a reference signal resource set level.

In some embodiments, the transceiver is further configured to send fourth indication information to the terminal device, where the fourth indication information indicates the one or more reference signal resource sets in each of the one or more cells that require the terminal device to report the power headrooms.

In some embodiments, the fourth indication information includes an identifier of the one or more cells and an identifier of the one or more reference signal resource sets in each of the one or more cells.

In some embodiments, the power headroom corresponding to the one or more reference signal resource sets is a power headroom of a first power headroom type, where the first power headroom type is a Type 3.

In some embodiments, the power headroom corresponding to the one or more reference signal resource sets is a power headroom of a second power headroom type, where the second power headroom type is a power headroom type at a reference signal resource set level.

In some embodiments, the power headroom information further includes the power headroom corresponding to each of the one or more cells, where the power headroom corresponding to each of the one or more cells is a power headroom of a first power headroom type, and the first power headroom type is a Type 3.

In some embodiments, the power headroom information further includes $P_{CMAX}$ corresponding to each of the one or more cells. $P_{CMAX}$ represents maximum transmit power at which the terminal device sends a reference signal on a current carrier of each of the one or more cells.

In some embodiments, that the transceiver is configured to receive the power headroom information from the terminal device includes: the transceiver module is configured to receive a medium access control MAC control element CE from the terminal device, where the MAC CE includes the power headroom information, and the power headroom information includes the power headroom corresponding to the one or more reference signal resource sets in each of the one or more cells.

In some embodiments, a communication apparatus is provided, configured to perform the method in any one of the embodiments discussed herein. The communication apparatus may be the network device in any one of the embodiments discussed herein, or a module applied to the network device, for example, a chip or a chip system. The communication apparatus includes at least one processor, configured to perform the method in any one of the embodiments discussed herein.

For example, the communication apparatus further includes a memory. The memory is coupled to the at least one processor, and the processor is configured to perform the method in any one of the embodiments discussed herein.

In some embodiments, the memory is configured to store program instruction and data. The memory is coupled to the at least one processor, and the at least one processor may invoke and execute the program instruction stored in the memory, to perform the method in any one of the embodiments discussed herein.

For example, the communication apparatus further includes a communication interface, and the communication interface is configured for the communication apparatus to communicate with another device. When the communication apparatus is a positioning management device, the communication interface is a transceiver, an input/output interface, a circuit, or the like.

In some embodiments, the communication apparatus includes: at least one processor and a communication interface, configured to perform the method in any one of the embodiments discussed herein, including: the at least one processor uses the communication interface to communicate with an external device; and the at least one processor is configured to run a computer program, so that the communication apparatus performs the method in any one of the embodiments discussed herein. It may be understood that the external device may be an object other than the processor or an object other than the communication apparatus.

In some embodiments, the communication apparatus is a chip or a chip system. The communication interface may be an input/output interface, an interface circuit, an output circuit, an input circuit, a pin, a related circuit, or the like on the chip or the chip system. The processor may also be embodied as a processing circuit or a logic circuit.

In some embodiments, a computer-readable storage medium is provided. The computer-readable storage medium stores a computer program. When the computer program is executed by a communication apparatus, the communication apparatus is enabled to perform the method in any one of the embodiments discussed herein.

In some embodiments, a computer program product including instructions is provided. When the instructions are executed by a computer, a communication apparatus is enabled to perform the method in any one of the embodiments discussed herein.

In some embodiments, a power headroom reporting system is provided, where the power headroom reporting system includes the terminal device according to any one of the foregoing embodiments and the network device according to any one of the foregoing embodiments.

BRIEF DESCRIPTION OF DRAWINGS

FIG. 1 is a schematic diagram 1 of a structure of an existing PHR MAC CE;

FIG. 2 is a schematic diagram 2 of a structure of an existing PHR MAC CE;

FIG. 10 is a schematic diagram of an example of a PHR MAC CE according to an embodiment of this application;

DESCRIPTION OF EMBODIMENTS

Figure 3:
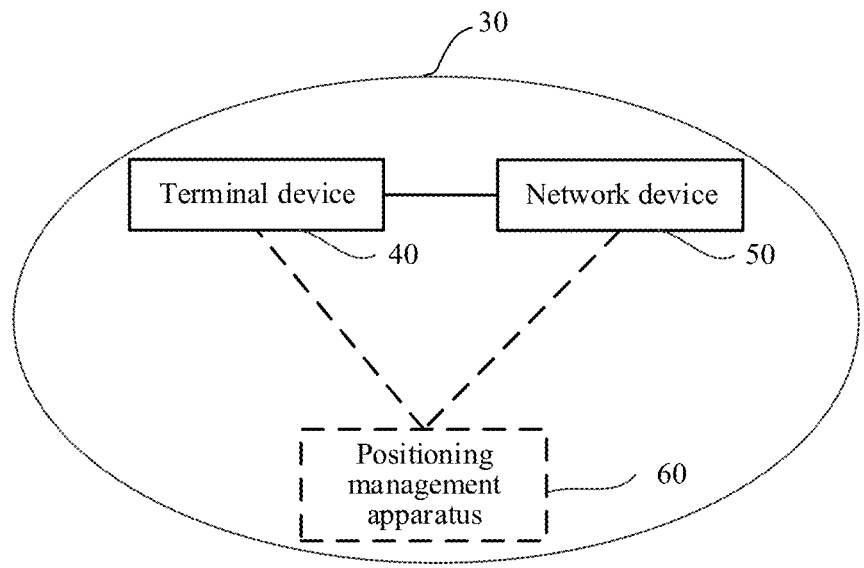
FIG. 3 is a schematic diagram of an architecture of a power headroom reporting system according to an embodiment of this application.

To facilitate understanding of the solutions in embodiments of this application, a brief description or definition of a related technology is first provided as follows:

First, a sounding reference signal (SRS):

The SRS in this embodiment of this application may include an uplink reference signal for multiple-input multiple-output (MIMO) (that is, a MIMO-SRS) used in a release 15 (reversion15, R15) and previous releases, an uplink positioning reference signal (pos-SRS) dedicated to positioning proposed in a release 16 (reversion16, R16), or another future reference signal, or the like. Certainly, in positioning methods of the R15 and the previous releases, MIMO-SRS may alternatively be used for positioning, for example, observed time difference of arrival (OTDOA) positioning. This is not limited in this embodiment of this application.

Second, a master cell group (MCG) and a secondary cell group (secondary cell group, SCG):

Both the MCG and the SCG are dual connectivity (DC) concepts. A group in which a cell (cell) in which the terminal device first initiates random access is located is an MCG.

Third, a primary cell (PCell), a secondary cell (Scell), a primary secondary cell (PScell), and a special cell (sPCell):

In an MCG, there may be multiple cells. One of the cells is used to initiate initial access. This cell is called the PCell. As the name implies, the PCell is the most "important" cell in the MCG. Similarly, there is the most important cell in the SCG, that is, a PSCell, which may alternatively be simply understood as a cell that initiates initial access in the SCG.

The sPCell includes the PCell and the PSCell. Because many signaling messages are sent only on the PCell and the PSCell, for ease of description, a concept of the sPCell is defined in a protocol.

Fourth, a power headroom report (PHR):

In current technologies, a power headroom (PH) reporting process performed by a terminal device is used to provide the following information for a serving base station:

A type 1 (Type1) PH refers to a difference between nominal maximum transmit power of the terminal device and estimated uplink shared channel (UL-SCH) transmit power for each activated serving cell.

A type 2 (Type2) PH refers to a difference between nominal maximum transmit power of the terminal device and estimated UL-SCH and physical uplink control channel (PUCCH) transmit power for an sPCell of the other medium access control (MAC) entity (that is, an evolved universal mobile telecommunication system (UMTS) terrestrial radio access (evolved-UMTS terrestrial radio access, E-UTRA) MAC entity in EN-DC, NE-DC, and NGEN-DC scenarios). The EN-DC refers to a dual connection (eNB NR dual connection) of the 4th generation (4G) evolved node B (evolved nodeB, eNB) and the 5th generation (5G) new radio (NR), and the 4G eNB is an anchor. The NE-DC refers to a dual connection (NR eNB dual connection) between the 5G NR and the 4G eNB, and the 5G NR is an anchor. The NGEN-DC refers to a dual connection (ng-eNB NR dual connection) between the 5G NR and an upgraded 4G base station (next-generation evolved NodeB, (ng-eNB)), and the ng-eNB is an anchor.

A type 3 (Type3) PH refers to a difference between nominal maximum transmit power of the terminal device and estimated SRS transmit power for each activated serving cell.

The maximum allowable exposure (maximum permissible exposure, MPE) maximum power reduction of a user equipment (UE) (the power management UE maximum power reduction, P-MPR) refers to power backoff applied by the UE to meet an FR2 MPE requirement of a serving cell.

It should be noted that, the serving cell in embodiments of this application includes a cell that provides various types of services for the terminal device. For example, the serving cell includes a PCell, an SCell, and a PSCell. For radio resource control (RRC) UE in a connected state (RRC_CONNECTED) for which carrier aggregation/dual connection (CA/DC) is not configured, there is only one serving cell, that is, a PCell. For an RRC_CONNECTED UE configured with CA/DC, the serving cell represents a set of an sPCell and all Scells. For definitions of the PCell, the Scell, the PSCell, and the sPCell, refer to the description of the third point above. Details are not described herein again.

It should be noted that, the uplink power control scheme of this application relates only to transmit power control of the SRS. Therefore, a PH of the Type 1 and a PH of the Type 2 are not described in detail in subsequent embodiments of this application. Only a problem related to reporting of the PH of the type 3 and reporting of the PH of the type 4 (Type 4) newly introduced in this embodiment of this application is described in a unified manner. This is uniformly described herein, and details are not described below. A PH of the type 4 (Type4) refers to a difference between nominal maximum transmit power of the terminal device and estimated SRS transmit power for a reference signal resource set of each activated serving cell.

Fifth, PHR triggering conditions:

The following events trigger the terminal device to report the PH:

Case 1: phr-ProhibitTimer expires or has expired, and for at least one activated serving cell of any MAC entity (the activated serving cell is used as a path loss reference), when the MAC entity has UL resources for transmitting new data, a path loss change value is greater than phr-Tx-PowerFactorChange dB since the last transmission of the PHR in the MAC entity.

Case 2: When the phr-PeriodicTimer expires, reporting is triggered once regardless of whether uplink transmission is available on the current link. If no resource is available, the reporting is triggered until the resource is available. Because there is no process for requesting resources in the following process.

Case 3: The higher layer configures or reconfigures the power headroom reporting function, and the configuration is not used to disable the function. For example, the RRC reconfigures a value of a timer.

Case 4: One SCell of any MAC entity configured with an uplink is activated.

Case 5: A PSCell is added. (That is, the PSCell is newly added or changed).

Case 6: The phr-ProhibitTimer expires or has expired, when the MAC entity has UL resources for a new transmission, and for any activated serving cell of any MAC entity configured with an uplink, the following conditions should be met:

There are UL resources allocated for transmission or PUCCH transmissions on the cell, and when the MAC entity has UL resources allocated for transmission or PUCCH transmissions on the cell since the last transmission of the PHR, the power backoff change required for power management of the cell is greater than phr-Tx-PowerFactor-Change dB.

Sixth, calculation of a PH of the Type3:

Calculation of a PH of the Type3 is classified into PH calculation based on actual SRS transmission and PH calculation based on reference SRS transmission.

For PH calculation based on the actual SRS transmission, if the following conditions are met:
 (1) The UE determines that the PH of the Type 3 for the activated serving cell is based on the actual SRS transmission (that is, an SRS actually exists in the network);
 (2) The UE is not configured with a physical uplink shared channel (PUSCH) for transmission on a carrier f of a serving cell c; and (3) A resource for the SRS transmission is provided by an SRS-Resource.

For an SRS transmission occasion i on an activated UL bandwidth part (BWP) of the carrier f of the serving cell c, calculation of a PH of the Type 3 (denoted as $PH_{type3,b,f,c}(i,q_s)$) of the UE meets the following formula (1):

$$PH_{type3,b,f,c}(i,q_s) = P_{CMAX,f,c}(i) - \{P_{O\_SRS,b,f,c}(q_s) + 10\log_{10}(2^\mu \cdot M_{SRS,b,f,c}(i)) + \alpha_{SRS,b,f,c}(q_s) \cdot PL_{b,f,c}(q_d) + h_{b,f,c}(i)\} \quad \text{formula (1)}$$

Definitions of parameters in formula (1) are as follows:

$P_{CMAX,f,c}(i)$ represents the configured transmit power of the UE based on the actual SRS transmission, that is, the maximum transmit power of the UE, for the SRS transmission occasion i on the carrier f of the serving cell c.

$P_{O\_SRS,b,f,c}(q_s)$ represents a nominal power or a power reference value, and is a target signal power expected by the base station. $q_s$ is an SRS resource set corresponding to SRS-ResourceSetId=0 for the UL BWP b.

$M_{SRS,b,f,c}(i)$ represents an SRS resource allocation bandwidth for the SRS transmission occasion i on the activated UL BWP b of the carrier f of the serving cell c, and is represented as a quantity of resource band (RB).

μ represents configuration related to a subcarrier spacing (SCS).

$\alpha_{SRS,b,f,c}(q_s)$ represents a path loss compensation adjustment factor, which is used to adjust the path loss compensation for the UE.

$PL_{b,f,c}(q_d)$ represents a downlink path loss estimate, in dB, and is calculated by the UE based on a reference signal index $q_d$ of an activated downlink (DL) BWP for the serving cell c.

$h_{b,f,c}(i)$ represents an SRS power control adjustment value for the SRS transmission occasion i on the activated UL BWP b of the carrier f of the serving cell c. The parameter is adjusted based on an uplink power control (TPC) command on a physical downlink control channel (PDCCH).

For PH calculation based on the reference SRS transmission, if the following conditions are met:
(1) The UE determines that a PH of the Type 3 for the activated serving cell is based on reference virtual SRS transmission (that is, there is no real SRS transmission in the network);
(2) The UE is not configured with PUSCH transmission on the carrier f of the serving cell c; and
(3) A resource for the SRS transmission is provided by an SRS-Resource.

For the SRS transmission occasion i on the activated UL BWP on the carrier f of the serving cell c, calculation of a PH of the Type 3 (denoted as $PH_{typ3,b,f,c}(i,q_s)$) of the UE meets the following formula (2):

$$PH_{type3,b,f,c}(i,q_s) = \tilde{P}_{CMAX,f,c}(i) - \{P_{O\_SRS,b,f,c}(q_s) + \alpha_{SRS,b,f,c}(q_s) \cdot PL_{b,f,c}(q_d) + h_{b,f,c}(i)\} \quad \text{formula (2)}$$

The meaning of $\tilde{P}_{CMAX,f,c}(i)$ in the formula (2) is similar to the meaning of $P_{CMAX,f,c}(i)$ in the formula (1), and is the configured maximum transmit power of the UE based on the reference SRS transmission. For meanings of other parameters in the formula (2), refer to the formula (1). Details are not described herein again.

It should be noted that the serving cell c in the foregoing formula (1) and formula (2) may be any serving cell of the UE. This is not limited in this embodiment of this application.

It should be noted that the PH calculation based on the actual SRS transmission is more refined, and the PH calculation based on the reference SRS transmission is a rough estimation value. This is uniformly described herein, and details are not described below.

Seventh, a PHR MAC control element (CE) structure:

In this embodiment of this application, only a multiple PHR MAC CE related to a PH of the Type 3 is described, and the multiple PHR MAC CE is used to report remaining power of each carrier when there are multiple carriers in the uplink. When multiple uplink serving cells are configured, the PHR MAC CE includes power headroom information of multiple serving cells (serving cells configured with uplink SRS carriers). The size of the PHR MAC CE is variable. There are two PHR MAC CE structures depending on whether the maximum serving cell identifier (ServCellIndex) of the serving cell configured with the uplink is greater than 8. For example, when the maximum ServCellIndex of the serving cell configured with the uplink is not greater than 8, a schematic diagram of a structure of an existing PHR MAC CE is shown in FIG. 1. The fields in the PHR MAC CE are defined as follows:

$C_i$: This field indicates whether a PH field of the serving cell whose ServCellIndex is i exists. The $C_i$ field set to "1" represents a PH field of the serving cell which reports the ServCellIndex as i. The $C_i$ field set to "0" represents a PH field of the serving cell which does not report the ServCellIndex as i. The ServCellIndex indicates a serving cell (ServCell) with a value range from 1 to 7.

R: Reserved bit, set to "0".

V: This field indicates whether the PH is based on the actual SRS transmission or the reference SRS transmission. For example, V=0 indicates that the PH is based on the actual SRS transmission. V=1 indicates that the PH is based on the actual SRS transmission. In addition, for a PH of the Type 1, a PH of the Type 2, and a PH of the Type 3, V=0 indicates that an octet containing a relevant $P_{CMAX,f,c}$ field is present, and V=1 indicates that an octet containing a relevant $P_{CMAX,f,c}$ field is omitted.

PH: This field indicates power headroom level. The length of the field is 6 bits, indicating 0-63 PHR levels, and the corresponding power headroom ranges from −32 dB to +38 dB.

P: The indication has two meanings:

If the mpe-reporting command is configured (which indicates whether the UE needs to report the MPE P-MPR in the PHR MAC CE.), then this field indicates whether the applied power back-off meets the MPE requirements. If the power back-off is less than P_MPR_0 as defined in technology standard (TS) 38.133, the MAC entity shall set P=0. Otherwise, set P=1.

If mpe-Reporting is not configured, this field indicates whether the MAC entity applies power backoff due to power management. If the power backoff due to power management is not applied and the corresponding $P_{CMAX,f,c}$ field has a different value, the MAC entity shall set P=1, otherwise set P=0.

$P_{CMAX,f,c}$: If present, this field indicates the $P_{CMAX,f,c}(i)$ or $\tilde{P}_{CMAX,f,c}(i)$ used to calculate the PH field above.

MPE: If mpe-Reporting is configured and P=1, the applied power backoff meets the MPE requirement. This 2-bit field indicates the corresponding measured value of a P-MPR level in dB in the TS 38.133. If mpe-reporting is not configured or P=0, this 2-bit field is reserved.

It should be noted that, currently, the PHR MAC CE is reported in concatenation mode according to the combination of "Type X PH and $P_{CMAX,f,c}$," as follows:

(1) A Type 2 PH field and $P_{CMAX,f,c}$ related to SpCell of another MAC entity (if reported);

(2) A Type 1 PH field and a corresponding $P_{CMAX,f,c}$ related to the PCell (if reported); and (3) One or more Type X PH fields (X=1 or 3) and $P_{CMAX,f,c}$ related to a corresponding serving cell other than the Pcell (if reported).

When maximum ServCellIndex of a serving cell configured with an uplink is greater than 8, a schematic diagram of a structure of an existing PHR MAC CE is shown in FIG. 2. For a definition of each field, refer to the meaning of each field in the PHR MAC CE shown in FIG. 1. For example, the difference lies in that a value of i in $C_i$ ranges from 1 to 31, and details are not described herein again.

It should be noted that, a serving cell 1, . . . , a serving cell n, and the like in FIG. 1 or FIG. 2 refer to other serving cells except the Pcell, which are uniformly described herein, and details are not described below.

The following describes the technical solutions in this embodiment of this application with reference to the accompanying drawings in embodiments of this application.

The technical solutions in embodiments of this application may be applied to various communication systems. For example, a long term evolution (LTE) system, an LTE frequency division duplex (FDD) system, an LTE time division duplex (TDD) system, a universal mobile telecommunication system (UMTS), a worldwide interoperability for microwave access (WiMAX) communication system, a 5G system, an NR system, or the like. The 5G mobile communication system in this application includes a non-standalone (NSA) 5G mobile communication system or a standalone (SA) 5G mobile communication system. The technical solutions provided in this application may be further applied to a future communication system, for example, the sixth generation mobile communication system. In addition, the communication system may also be a public land mobile network (PLMN) network, a device-to-device (device-to-device, D2D) communication system, a machine to machine (M2M) communication system, an internet of things (IoT) communication system, or another communication system.

FIG. 3 is a schematic diagram of an architecture of a power headroom reporting system 30 applying the power headroom reporting method according to an embodiment of this application is applied. As shown in FIG. 3, the power headroom reporting system 30 includes a terminal device 40 and a network device 50. The terminal device 40 is configured to: determine power headroom corresponding to one or more reference signal resource sets in each of one or more cells, and send power headroom information to the network device 50. The power headroom information includes the power headroom corresponding to the one or more reference signal resource sets in each of the one or more cells, and the one or more cells are cells that are among cells participating in positioning of the terminal device and that require the terminal device to report the power headroom. The network device 50 is configured to: receive power headroom information from the terminal device 40, and determine an adjustment value of uplink transmit power of the terminal device 40 based on the power headroom information. An implementation of the solution is described in detail in a subsequent method embodiment. Details are not described herein. In this solution, the power headroom information sent by the terminal device 40 to the network device 50 includes the power headroom corresponding to the one or more reference signal resource sets in each of the one or more cells. Therefore, in this solution, the power headroom reported by the terminal device 40 to the network device 50 includes a power headroom at a reference signal resource set level. However, in a current standard related to uplink power, the calculation of the Type 3 power headroom is at a reference signal resource set level. Therefore, a reporting level of the power headroom provided in embodiments of this application matches a calculation level the Type 3 power headroom. Therefore, a problem in current technologies that the calculation level of the Type 3 power headroom does not match the reporting level of the Type 3 power headroom can be avoided.

It should be understood that FIG. 3 is merely an example schematic diagram of an architecture of a power headroom reporting system 30 to which the power headroom reporting method provided in this embodiment of this application is applied, and the power headroom reporting system 30 includes only one terminal device or one network device. In other words, the power headroom reporting system 30 may include a plurality of terminal devices and a plurality of network devices. This is uniformly described herein, and details are not described below.

In some embodiments, as shown in FIG. 3, the power headroom reporting system 30 may further include a positioning management device 60. The positioning management device 60 may directly communicate with the terminal device 40 or the network device 50, or may communicate with the terminal device or the network device through forwarding by another device. This is not limited in this embodiment of this application. The positioning management device 60 is configured to send fourth indication information to the terminal device 40, where the fourth indication information indicates the one or more reference signal resource sets in each of the one or more cells that require the terminal device 40 to report the power headrooms.

Although not shown, the power headroom reporting system 30 may further include another function or module such as a mobility management function. This is not limited in this embodiment of this application.

In some embodiments, the power headroom reporting system 30 provided in this embodiment of this application may be applicable to the foregoing various communication systems. A 5G mobile communication system is used as an example. A function or a network element corresponding to the network device in FIG. 3 may be a next-generation radio access network (NG-RAN) device in the 5G mobile communication system. A function or a network element corresponding to the foregoing positioning management device may be a location management function (LMF) or a location management component (LMC) in the 5G mobile communication system, or may be a local location management function (LLMF) in an NG-RAN device. A function or a network element corresponding to the foregoing mobility management function may be an access and mobility management function (AMF) in the 5G mobile communication system. This is not limited in this embodiment of this application.

Figure 4:
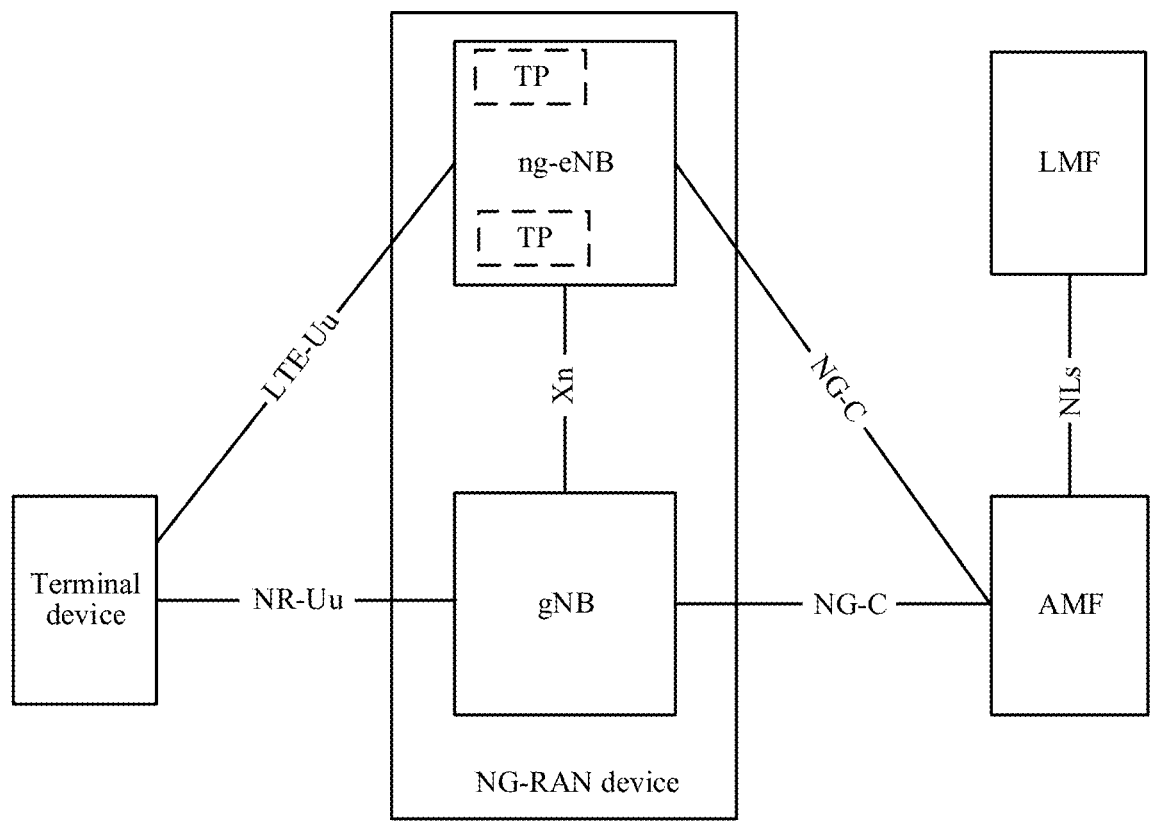
FIG. 4 is a schematic diagram 1 of relationships between a terminal device, an NG-RAN device, an LMF, and an AMF according to an embodiment of this application.
Figure 5:
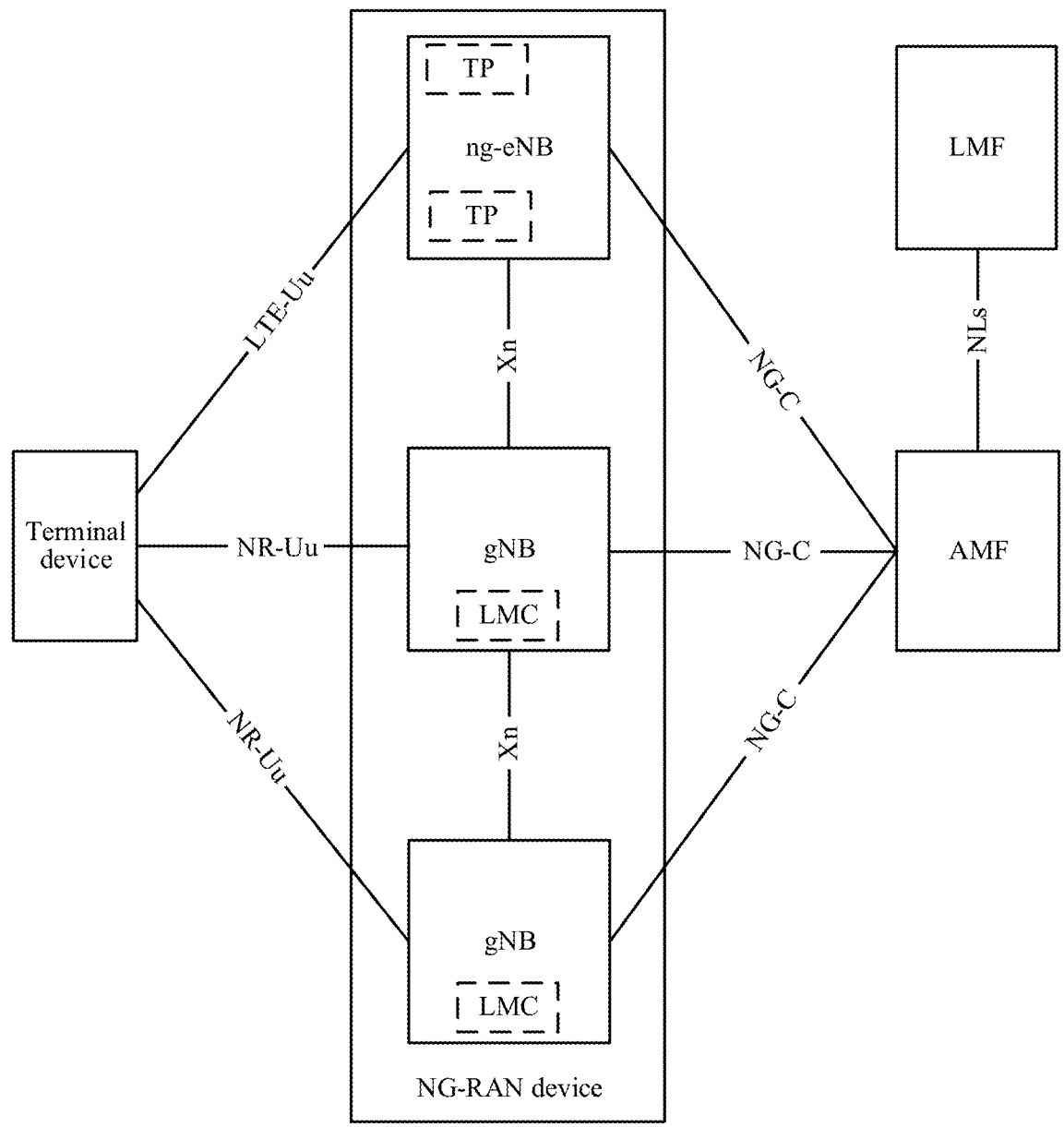
FIG. 5 is a schematic diagram 2 of relationships between a terminal device, an NG-RAN device, an LMF, and an AMF according to an embodiment of this application.

For example, FIG. 4 or FIG. 5 is a schematic diagram of relationships between a terminal device, an NG-RAN device, an LMF, and an AMF when the power headroom reporting method according to an embodiment of this application is applied to a 5G mobile communication system. As shown in FIG. 4, the terminal device is connected to a radio access network via an LTE-Uu interface and/or an NR-Uu interface via an ng-eNB and a gNB. The radio access network is connected to the core network via the AMF through an NG-C interface. The NG-RAN includes one or more ng-eNBs. (In FIG. 4, one ng-eNB is used as an example for illustration). The NG-RAN may also include one or more gNBs. (In FIG. 4, one gNB is used as an example for illustration). The NG-RAN may further include one or more ng-eNBs and one or more gNBs. The ng-eNB is an LTE base station connected to the 5G core network, and the gNB is a 5G base station connected to the 5G core network. The core network includes the AMF and the LMF. The AMF is configured to implement a function such as access management, and the LMF is configured to interact with a terminal device or an NG-RAN device to implement various functions (such as a positioning function or a power control function). The AMF and the LMF are connected through an NLs interface. FIG. 5 is similar to FIG. 4, and a difference is as follows: The positioning management function apparatus or component (such as an LMF) in FIG. 4 is deployed in a core network, and the positioning management function apparatus or component (such as an LMC) in FIG. 5 may be deployed in an NG-RAN device. As shown in FIG. 5, the gNB includes the LMC. The LMC is a part of functional components of the LMF and may be integrated into the gNB of the NG-RAN device.

It should be understood that FIG. 4 or FIG. 5 is merely an example schematic diagram of relationships between a terminal device, an NG-RAN device, an LMF, and an AMF when the power headroom reporting method in this embodiment of this application is applied to a 5G mobile communication system. It is not limited to include only one NG-RAN device or only one terminal device.

It should be understood that the devices or function node included in FIG. 4 or FIG. 5 are merely described as examples, and constitutes no limitation on embodiments of this application. Actually, FIG. 4 or FIG. 5 may further include another network element, device, or function node that has an interaction relationship with the device or function node shown in the figure. This is not limited herein.

In some embodiments, a terminal device in this embodiment of this application may be an access terminal, a subscriber unit, a subscriber station, a mobile radio station, a mobile station, a relay station, a remote station, a remote terminal, a mobile device, a user terminal, UE, a terminal, or a wireless communication device, a user agent, a user device, a cellular phone, a cordless phone, a session initiation protocol (SIP) phone, a wireless local loop (WLL) station, a personal digital assistant (PDA), a handheld device with a wireless communication function, a computing device, or another processing device connected to a wireless modem, an in-vehicle device, a wearable device, a terminal device in a future 5G network, a terminal device in a future evolved PLMN, a terminal device in a future Internet of Vehicles, or the like. This is not limited in this embodiment of this application.

As an example instead of a limitation, in this embodiment of this application, the terminal may be a mobile phone, a tablet computer, a computer with a wireless transceiver function, a virtual reality terminal device, an augmented reality terminal device, a wireless terminal in industrial control, a wireless terminal in unmanned driving, a wireless terminal in remote surgery, or a wireless terminal in smart grid, a wireless terminal in transportation security, a wireless terminal in smart city, and a wireless terminal in smart home.

As an example instead of a limitation, in this embodiment of this application, the wearable device may also be referred to as a wearable smart device, which is a general term for intelligently designing daily wear and developing wearable devices by applying wearable technology, such as glasses, gloves, watches, clothing, and shoes. The wearable device is a portable device that is directly worn on the body or integrated into clothes or accessories of the user. The wearable device is not only a hardware device, but also implement powerful functions through software support, data interaction, and cloud interaction. In a broad sense, the wearable intelligent device includes full-function, large-size, and complete or partial functions that can be implemented without relying on a smartphone, for example, smartwatches or smart glasses, as well as only focusing on a type of application function, and needing to be used with other devices such as smartphones, such as various smart bands and smart jewelry for physical sign monitoring.

In addition, the terminal device in embodiments of this application may alternatively be user equipment in an IoT system. An IoT is an important part of future development of information technologies. A main technical feature of the IoT is connecting a thing to a network through a communication technology, to implement an intelligent network for interconnection between a person and a machine or between one thing and another. In this embodiment of this application, the IoT technology may implement massive connections, in-depth coverage, and power saving of the terminal, through, for example, a narrow band (NB) technology.

In addition, in this embodiment of this application, the terminal device may further include a sensor such as an intelligent printer, a train detector, and a gas station. Main functions of the terminal device include collecting data (some terminal devices), receiving control information and downlink data of the network device, sending an electromagnetic wave, and transmitting uplink data to the network device.

In some embodiments, the network device in this embodiment of this application may be any communication device that has a wireless transceiver function and that is configured to communicate with the terminal device. The network device includes but is not limited to: an evolved node B (eNB), a baseband unit (BBU), and an access point (AP) in a wireless fidelity (Wi-Fi) system, a wireless relay node, a wireless backhaul node, a transmission point (TP), a TRP, or the like. Alternatively, the network device may be a gNB, a TRP, or a TP in a 5G system, or one or one group (including a plurality of antenna panels) of a base station in a 5G system. In addition, the network device may alternatively be a network node that forms a gNB or a TP, for example, a BBU, a distributed unit (DU), or the like.

In some deployments, the gNB may include a central unit (CU) and a DU. In addition, the gNB may further include an active antenna unit (AAU). The CU implements some functions of the gNB, and the DU implements some functions of the gNB. For example, the CU is responsible for processing a non-real-time protocol and a service, and implementing functions of an RRC and a packet data convergence protocol (PDCP) layer. The DU is responsible for processing a physical layer protocol and a real-time service, and implementing functions of a radio link control (RLC) layer, a medium access control (MAC) layer, and a physical (PHY) layer. The AAU performs some physical layer processing functions, RF processing, and functions related to active antennas. Because information at the RRC layer is finally changed into information at the PHY layer, or is changed from information at the PHY layer, in this architecture, the higher layer signaling such as the RRC layer signaling may also be considered to be sent by the DU, or be sent by a DU+AAU. It may be understood that the network device may be a device including one or more of a CU node, a DU node, and an AAU node.

In some embodiments, the network device and the terminal device in this embodiment of this application may communicate with each other through a licensed spectrum, may communicate with each other through an unlicensed spectrum, or may communicate with each other through both a licensed spectrum and an unlicensed spectrum. The network device and the terminal device may communicate with each other by using a spectrum below 6 gigahertz (GHz), may communicate with each other by using a spectrum above 6 GHz, or may communicate with each other by using both a spectrum below 6 GHz and a spectrum above 6 GHz. A spectrum resource used between the network device and the terminal device is not limited in embodiments of this application.

In some embodiments, the terminal device or the network device in this embodiment of this application may be deployed on land, including indoor or outdoor, handheld, or vehicle-mounted; may also be deployed on the water surface; and may also be deployed in an aircraft, a balloon, and a satellite in the air. Application scenarios of the terminal device or the network device are not limited in embodiments of this application.

In some embodiments, in embodiments of this application, the terminal device or the network device includes a hardware layer, an operating system layer running above the hardware layer, and an application layer running above the operating system layer. The hardware layer includes hardware such as a central processing unit (CPU), a memory management unit (MMU), a memory (also referred to as a main memory), and the like. The operating system may be any one or more types of computer operating systems, for example, a Linux operating system, a Unix operating system, an Android operating system, an iOS operating system, or a Windows operating system, that implement service processing by using a process. The application layer includes applications such as a browser, an address book, word processing software, and instant messaging software. In addition, a structure of an execution body of the method provided in embodiments of this application is not particularly limited in this embodiment of this application, provided that communication can be performed according to the method provided in embodiments of this application by running a program that records code of the method provided in embodiments of this application. For example, the method provided in this embodiment of this application may be performed by a terminal device or a network device, or a function module that is in the terminal device or the network device and that can invoke and execute a program.

In other words, a related function of the terminal device or the network device in this embodiment of this application may be implemented by one device, or may be jointly implemented by a plurality of devices, or may be implemented by one or more function modules in one device. This is not limited in this embodiment of this application. It may be understood that the foregoing function may be a network element in a hardware device, may be a software function running on dedicated hardware, a combination of hardware and software, or a virtualization function instantiated on a platform (for example, a cloud platform).

Figure 6:
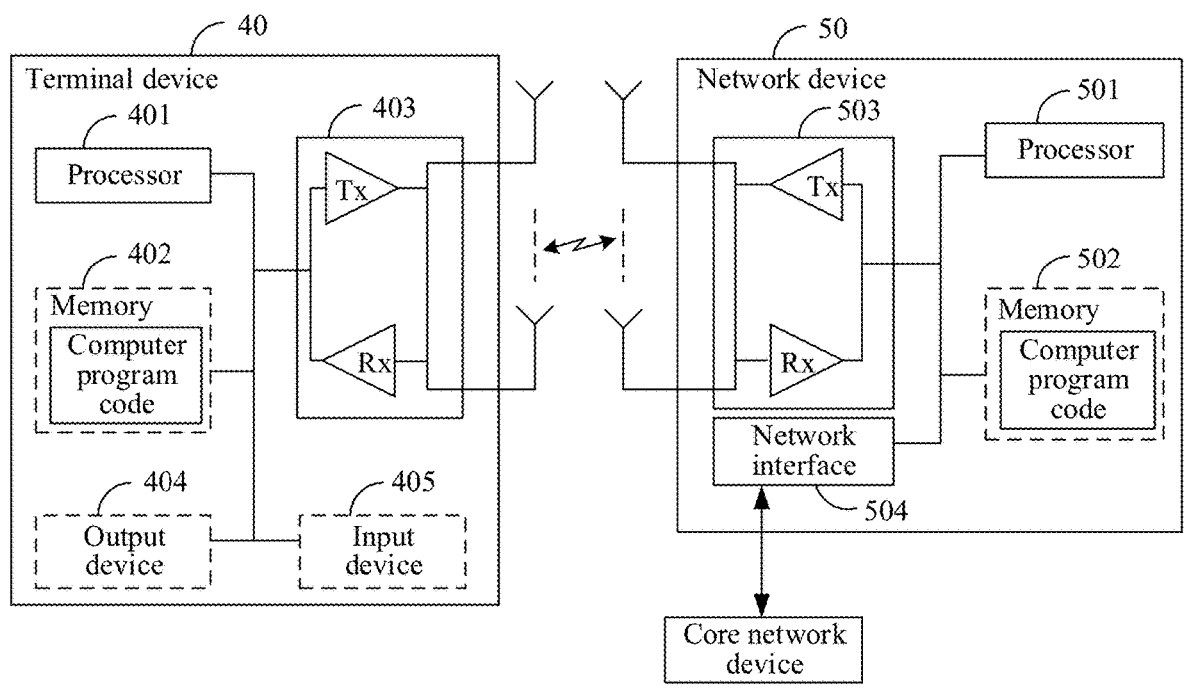
FIG. 6 is a schematic diagram of a structure of a communication apparatus according to an embodiment of this application.

For example, FIG. 6 is a schematic diagram of a structure of a terminal device 40 and a network device 50 according to an embodiment of this application.

The terminal device 40 includes at least one processor 401 and at least one transceiver 403. In some embodiments, the terminal device 40 may further include at least one memory 402, at least one output device 404, or at least one input device 405.

The processor 401, the memory 402, and the transceiver 403 are connected via a communication line. The communication line may include a path for transmitting information between the foregoing components.

The processor 401 may be a general-purpose central processing unit (CPU), another general-purpose processor, a digital signal processor (DSP), an application specific integrated circuit (ASIC), a field programmable gate array (FPGA) or another programmable logic device, a transistor logic device, a hardware component, or any combination thereof. The general-purpose processor may be a microprocessor, or may be any conventional processor. During implementation, as an embodiment, the processor 401 may also include a plurality of CPUs, and the processor 401 may be a single-core processor or a multi-core processor. The processor herein may be one or more devices, circuits, or processing cores configured to process data.

The memory 402 may be an apparatus with a storage function. For example, the memory may be a read-only memory (ROM) or other type of static storage device that can store static information and instructions, a random access memory (RAM), or other type of dynamic storage device that can store information and instructions, may also be a programmable read-only memory (PROM), an erasable programmable read-only memory (EPROM), an electrically erasable programmable read-only memory (EEPROM), a compact disc read-only memory (CD-ROM) or other optical disk storage, optical disk storage (including compact disc, laser disc, optical disc, digital versatile disc, Blu-ray disc, and so on), magnetic disk storage medium or another magnetic storage device, or any other medium that can be configured to carry or store desired program code in a form of instructions or a data structure and that can be accessed by a computer, but is not limited thereto. The memory 402 may exist independently, and is connected to the processor 401 via a communication line. Alternatively, the memory 402 and the processor 401 may be integrated together.

The memory 402 is configured to store computer-executable instructions for executing the solution of this application, and the processor 401 controls execution of the computer-executable instructions. The processor 401 is configured to execute the computer-executable instructions stored in the memory 402, to implement the power headroom reporting method in this embodiment of this application.

Alternatively, In some embodiments, in this embodiment of this application, the processor 401 may perform a processing-related function in the power headroom reporting method provided in following embodiments of this application. The transceiver 403 is responsible for communicating with another device or a communication network. This is not limited in this embodiment of this application.

In some embodiments, the computer-executable instruction in this embodiment of this application may also be referred to as application program code or computer program code. This is not limited in this embodiment of this application.

The transceiver 403 may use any apparatus such as a transceiver, and is configured to communicate with another device or a communication network, for example, an Ethernet, a RAN, or a wireless local area network (WLAN). The transceiver 403 includes a transmitter (Tx) and a receiver (Rx).

The output device 404 communicates with the processor 401, and may display information in a plurality of manners. For example, the output device 404 may be a liquid crystal display (LCD), a light emitting diode (LED) display device, a cathode ray tube (CRT) display device, or a projector.

The input device 405 communicates with the processor 401, and may receive user input in a plurality of manners. For example, the input device 405 may be a mouse, a keyboard, a touchscreen device, or a sensor device.

The network device 50 includes at least one processor 501, at least one transceiver 503, and at least one network interface 504. In some embodiments, the network device 50 may further include at least one memory 502. The processor 501, the memory 502, the transceiver 503, and the network interface 504 are connected via the communication line. The network interface 504 is configured to connect to a core network device via a link (for example, an Si interface), or connect to a network interface of another network device via a wired or wireless link (for example, an X2 interface) (not shown in FIG. 6). This is not limited in this embodiment of this application. In addition, for related descriptions of the processor 501, the memory 502, and the transceiver 503, refer to descriptions of the processor 401, the memory 402, and the transceiver 403 in the terminal device 40. Details are not described herein again.

Figure 7:
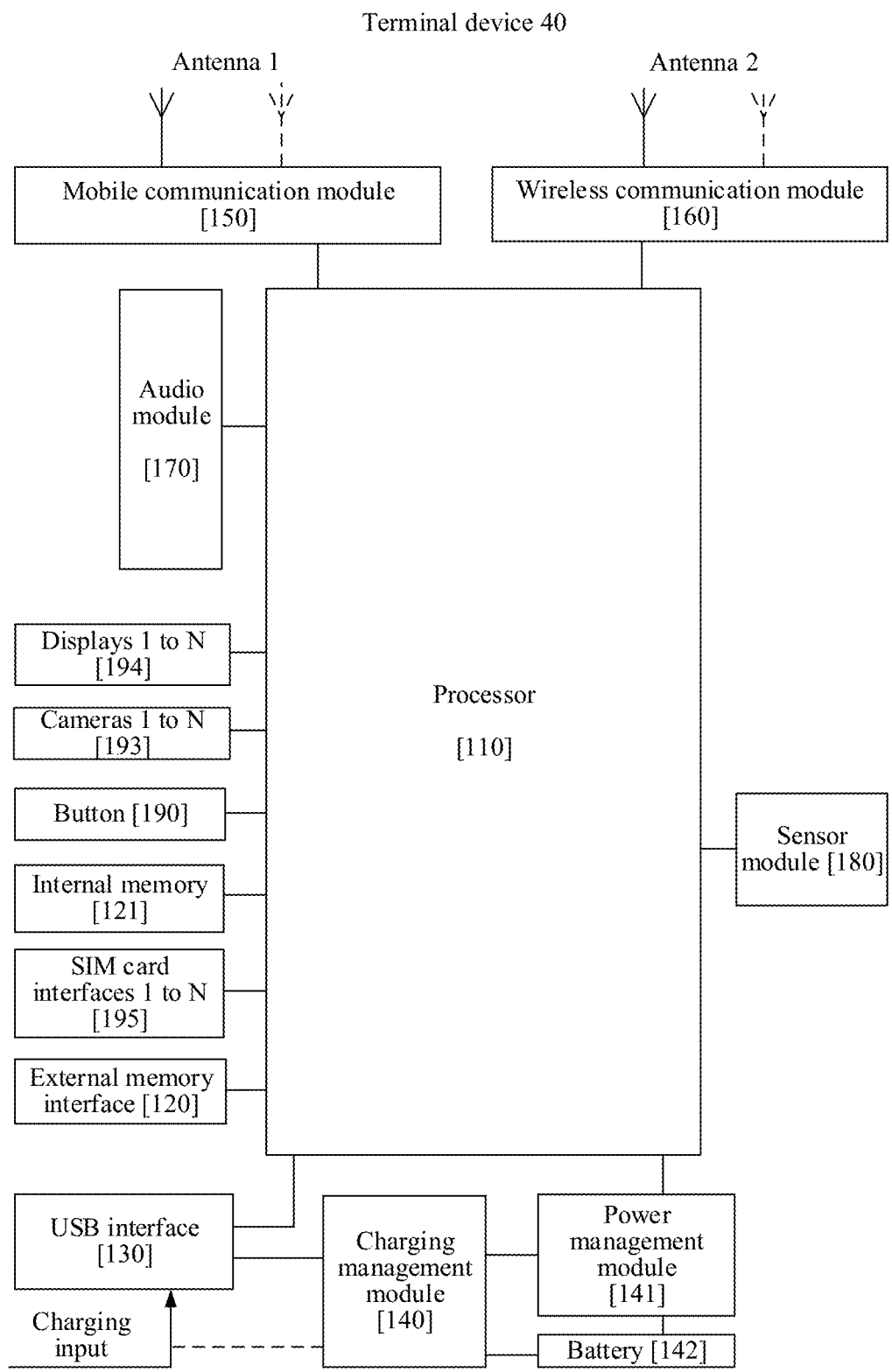
FIG. 7 is a schematic diagram of a structure of a terminal device according to an embodiment of this application.

With reference to the schematic diagram of the structure of the terminal device 40 shown in FIG. 6, for example, FIG. 7 is a structural form of the terminal device 40 according to an embodiment of this application.

In some embodiments, a function of the processor 401 in FIG. 6 may be implemented by the processor 110 in FIG. 7.

In some embodiments, a function of the transceiver 403 in FIG. 6 may be implemented by an antenna 1, an antenna 2, a mobile communication module 150, a wireless communication module 160, and the like in FIG. 7. The mobile communication module 150 may provide a solution that is applied to the terminal device 40 and that includes a wireless communication technology such as LTE, NR, or future mobile communication. The wireless communication module 160 may provide a solution that is applied to the terminal device 40 and that includes a wireless communication technology such as WLAN (for example, a Wi-Fi network), Bluetooth (BT), global navigation satellite system (GNSS), frequency modulation (FM), near field communication (NFC), and infrared. In some embodiments, the antenna 1 and the mobile communication module 150 in the terminal device 40 are coupled, and the antenna 2 and the wireless communication module 160 in the terminal device are coupled, so that the terminal device 40 can communicate with a network and another device through a wireless communication technology.

In some embodiments, a function of the memory 402 in FIG. 6 may be implemented by the internal memory 51 in FIG. 7, an external memory connected to the external memory interface 50, or the like.

In some embodiments, a function of the output device 404 in FIG. 6 may be implemented by a display 194 in FIG. 7.

In some embodiments, a function of the input device 405 in FIG. 6 may be implemented by a mouse, a keyboard, a touchscreen device, or the sensor module 180 in FIG. 7.

In some embodiments, as shown in FIG. 7, the terminal device 40 may further include one or more of an audio module 170, a camera 193, a button 190, a SIM card interface 195, a USB interface 40, a charging management module 140, a power management module 141, and a battery 142.

It may be understood that the structure shown in FIG. 7 does not constitute a limitation on the terminal device 40. For example, in other embodiments of this application, the terminal device 40 may include more or fewer components than those shown in the figure, or some components may be combined, or some components may be split, or the components may be differently arranged. The components shown in the figure may be implemented by hardware, software, or a combination of software and hardware.

It may be understood that the network device 50 and the terminal device 40 in this embodiment of this application may also be referred to as a communication apparatus, and the network device and the terminal device may be a general-purpose device or a dedicated device. This is not limited in this embodiment of this application.

The following describes in detail the power headroom reporting method provided in embodiments of this application with reference to FIG. 1 to FIG. 7.

It should be understood that, in the description of this application, unless otherwise specified, "/" means that associated objects are in an "or" relationship. For example, A/B may represent A or B. A and B may be singular or plural. In addition, in the description of this application, unless otherwise specified, "a plurality of" means two or more. At least one of the following items (pieces) or a similar expression thereof refers to any combination of these items, including any combination of singular items (pieces) or plural items (pieces). For example, at least one of a, b, or c may represent: a, b, c, a-b, a-c, b-c, or a-b-c, where a, b, and c may be single or multiple. In addition, to clearly describe the technical solutions in embodiments of this application, in embodiments of this application, terms such as "first" and "second" are used to distinguish between same objects or similar objects whose functions and purposes are basically the same. A person skilled in the art may understand that the terms such as "first" and "second" do not limit a quantity or an execution sequence. The terms such as "first" and "second" do not indicate a definite difference. In addition, in embodiments of this application, words such as "example" or "for example" are used to represent an example, an illustration, or a description. Any embodiment or design scheme described as an "example" or "for example" in embodiments of this application should not be explained as being more preferred or having more advantages than another embodiment or design scheme. Exactly, the words such as "example" or "for example" are used to present a relative concept in a manner for ease of understanding.

It should be noted that, a name of a message between network elements or a name of each parameter in a message in following embodiments of this application is merely an example. In an implementation, another name may alternatively be used. This is not limited in this embodiment of this application.

Figure 8:
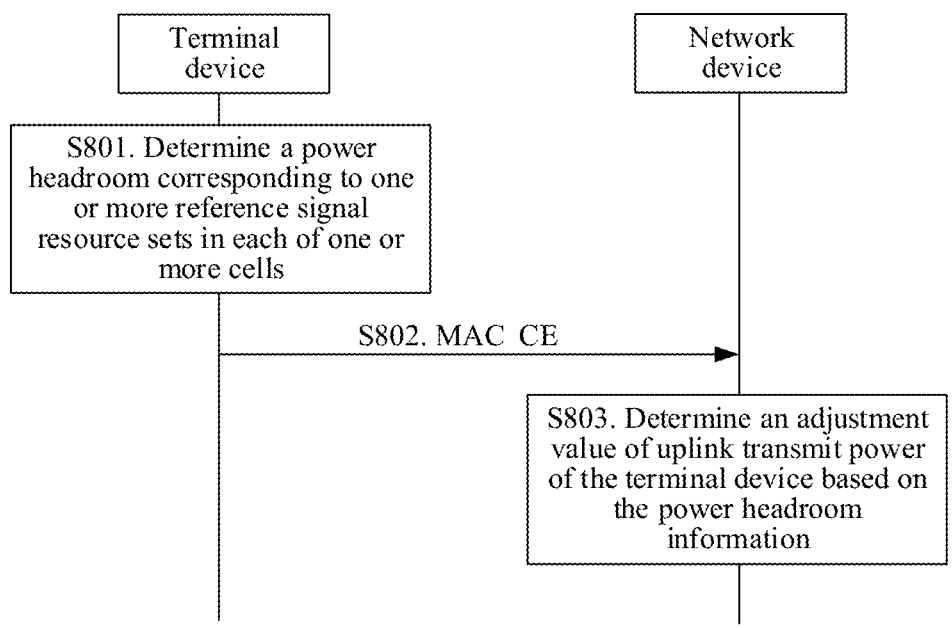
FIG. 8 is a schematic flowchart of a power headroom reporting method according to an embodiment of this application.

As shown in FIG. 8, a power headroom reporting method according to an embodiment of this application is provided. The power headroom reporting method includes the following operations S801 to S803.

S801. A terminal device determines a power headroom corresponding to one or more reference signal resource sets in each of one or more cells. The one or more cells are cells that are among cells participating in positioning of the terminal device and that require the terminal device to report the power headroom.

In some embodiments, the one or more cells in this embodiment of this application are cells that are among serving cells of a terminal device participating in positioning of the terminal device and that require the terminal device to report the power headroom. For a concept of the serving cell, reference may be made to the foregoing embodiment, and details are not described herein again.

It should be noted that, a cell in this embodiment of this application refers to an activated cell, and a reference signal resource set in this embodiment of this application refers to an activated reference signal resource set. In this embodiment of this application, "activation" may be understood as participating in sending and/or receiving of data or a reference signal. This is uniformly described herein, and details are not described below.

It should be noted that, the "cell" in embodiments of this application may alternatively be replaced with an "uplink carrier". In other words, the reference signal resource set in this embodiment of this application may alternatively be a reference signal resource set on an uplink carrier. This is uniformly described herein, and details are not described below.

S802. The terminal device sends power headroom information to the network device. Correspondingly, the network device receives the power headroom information from the terminal device. The power headroom information includes a power headroom corresponding to one or more reference signal resource sets in each of the one or more cells.

As shown in FIG. 8, in a possible implementation, that the terminal device sends power headroom information to the network device includes: The terminal device sends a MAC CE to the network device, where the MAC CE includes the power headroom information. Correspondingly, that the network device receives the power headroom information from the terminal device includes: The network device receives a MAC CE from the terminal device, where the MAC CE includes the power headroom information.

It may be understood that because the MAC CE in this embodiment of this application is used by the terminal device to report a PHR to the network device, the MAC CE in this embodiment of this application may be referred to as a PHR MAC CE. This is uniformly described herein, and details are not described below.

S803. The network device determines an adjustment value of uplink transmit power of the terminal device based on the power headroom information.

In this embodiment of this application, for a manner in which the network device determines the adjustment value of the uplink transmit power of the terminal device based on the power headroom information, refer to current technologies. This is not limited in this embodiment of this application.

The following describes in detail the foregoing operations S801 to S803 in four scenarios.

Scenario 1: The power headroom corresponding to the one or more reference signal resource sets is a power headroom of a first power headroom type, where the first power headroom type is a Type 3. That is, the scenario 1 reuses an existing Type 3 power headroom type. In addition, the power headroom information further includes second indication information, where the second indication information indicates whether the power headroom information includes the power headroom corresponding to each reference signal resource set in each of the one or more cells.

In some embodiments, in this scenario, the power headroom information may further include first indication information, where the first indication information indicates whether the terminal device reports a power headroom at a reference signal resource set level of the first cell, and the first cell is a cell used by the terminal device to initiate initial access. For example, the first cell is a serving cell of the terminal device used by the terminal device to initiate initial access, for example, a PCell.

In some embodiments, in this scenario, the power headroom information may further include $P_{CMAX}$ corresponding to each of the one or more cells. $P_{CMAX}$ represents maximum transmit power at which the terminal device sends a reference signal on a current carrier of each of the one or more cells.

Certainly, in this embodiment of this application, the power headroom information further includes a Type 1 or Type 2 power headroom corresponding to each of the one or more cells. This is not limited in this embodiment of this application.

For example, the following that the first cell is a PCell and the terminal device is required to report the power headroom at the reference signal resource set level of the PCell is used as an example. When the maximum ServCellIndex of the serving cell configured with the uplink is not greater than 8, a schematic diagram of a structure of a PHR MAC CE according to an embodiment of this application may be shown in FIG. 9. The foregoing first indication information may be represented by an R field in a part (1-1) in FIG. 9, and the second indication information may be represented by a D area field in a part (1-2) in FIG. 9. The foregoing power headroom may be represented by a PH region field in a part (2-1) and a part (3-1) in FIG. 9. The foregoing $P_{CMAX}$ may be represented by $P_{CMAX}$ region field in a part (2-2) and a part (3-2) in FIG. 9. The meanings of the fields in the PHR MAC CE are as follows:

(1-1): The R field indicates whether the terminal device reports the power headroom at the reference signal resource set level of the PCell. For example, R=0 indicates that the terminal device does not report the power headroom of the reference signal resource set level of the PCell (it may also be understood that the terminal device reports a cell-level power headroom of the PCell, or may be understood that the PCell reports the power headroom at a cell-level). R=1 indicates that the terminal device reports the power headroom at the reference signal resource set level of the PCell (it may also be understood that the PCell reports the power headroom at the reference signal resource set level.) Alternatively, R=1 indicates that the terminal device does not report the power headroom at the reference signal resource set level of the PCell, and R=0 indicates that the terminal device reports the power headroom at the reference signal resource set level of the PCell. This is not limited in this embodiment of this application.

Figure 9:
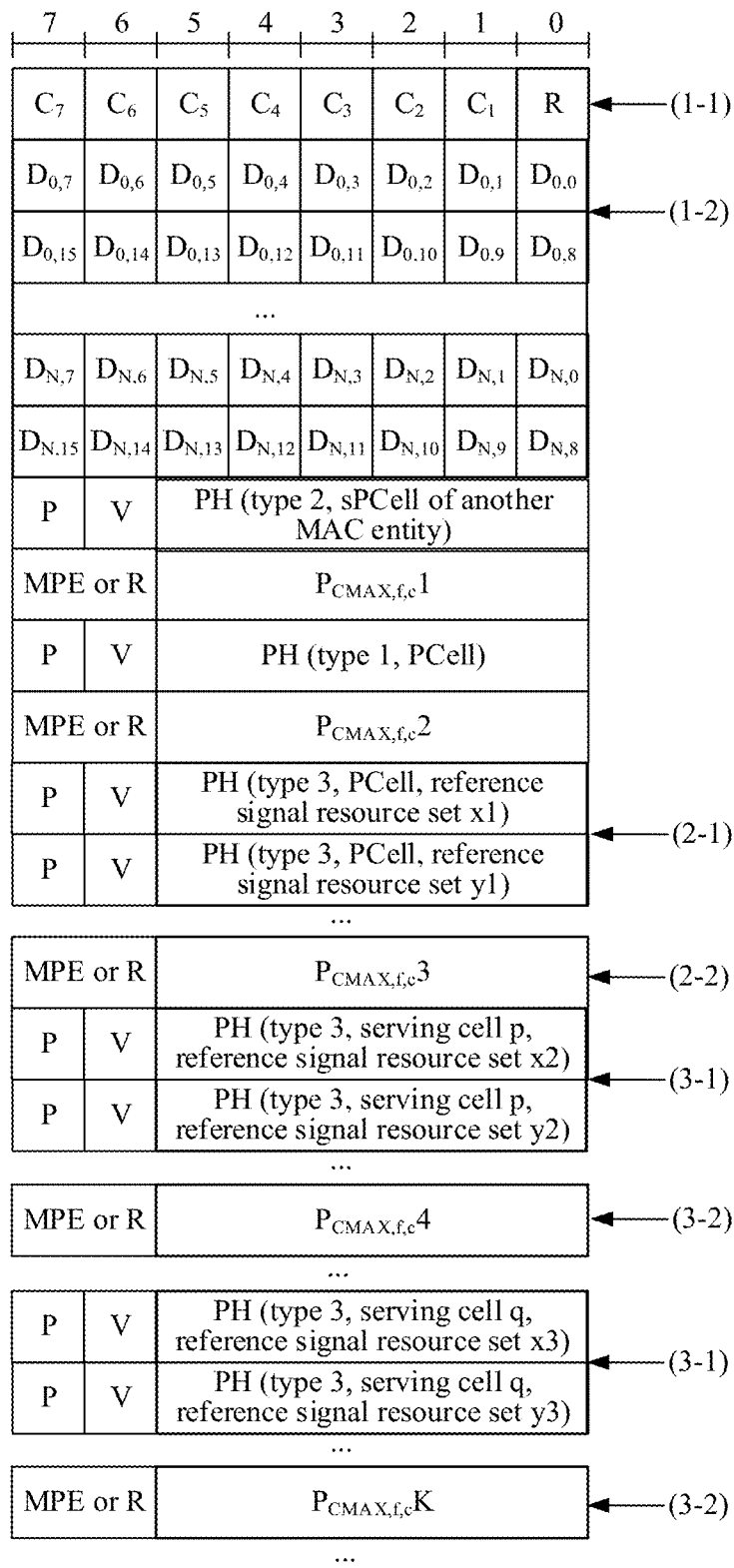
FIG. 9 is a schematic diagram 1 of a structure of a PHR MAC CE according to an embodiment of this application.

(1-2): A D region indicates whether the power headroom information includes a power headroom corresponding to each reference signal resource set in each of one or more cells. Where, $D_{n,j}$ (n=0, . . . , N; j=0, 1, . . . , M) has two subscripts. The first subscript n indicates a cell identifier (index), where n=0 indicates a PCell, and n>1 indicates another serving cell other than the PCell that reports a power headroom. N is the total number of serving cells other than the PCell that report power headrooms. When the maximum ServCellIndex of the serving cell configured with the uplink is not greater than 8, N is a positive integer less than or equal to 7. The second subscript j represents a corresponding reference signal resource set, and is corresponding to each cell. A value of j ranges from 0 to M, and M=a quantity of reference signal resource sets in the cell −1. In FIG. 9, M=15 is used as an example for description. For example, $D_{n,j}$=1 indicates that the terminal device reports the power headroom of the reference signal resource set j of the cell n. $D_{n,j}$=0 indicates that the terminal device does not report the power headroom of the reference signal resource set j of the cell n. Alternatively, $D_{n,j}$=1 indicates that the terminal device does not report the power headroom of the reference signal resource set j of the cell n. $D_{n,j}$=0 indicates that the terminal device reports the power headroom of the reference signal resource set j of the cell n.

(2-1): The PH region includes a power headroom of the Type 3 of all reference signal resource sets ($D_{0,m}=1$, m=0, 1, 2, . . . , 15) that are of the PCell and that are indicated in the D domain and that require the terminal device to report power headrooms.

(2-2): This $P_{CMAX}$ region indicates the maximum transmit power at which the terminal device sends a reference signal on a current carrier of the PCell. It should be noted that, for all reference signal resource sets of the PCell that require the terminal device to report a Type 3 power headroom, the same $P_{CMAX,f,c}$ is shared. In other words, in this embodiment of this application, $P_{CMAX,f,c}$ is at a cell level.

(3-1): The PH region includes Type 3 power headrooms of all reference signal resource sets ($D_{n,m}=1$, m=0, 1, 2, . . . , 15) that are indicated in the D region and that are of the serving cell n (n=p and n=q are used as an example) and that require the terminal device to report power headroom.

(3-2): This $P_{CMAX}$ region represents maximum transmit power at which the terminal device sends a reference signal on a current carrier of the serving cell n. It should be noted that, for all reference signal resource sets of the serving cell n that require the terminal device to report a Type 3 power headroom, the same $P_{CMAX,f,c}$ is shared. In other words, in this embodiment of this application, $P_{CMAX,f,c}$ c is at a cell level.

It can be known from the combination of (2-1) and (2-2) or the combination of (3-1) and (3-2), which is different from the manner in which a combination of "one PH+one $P_{CMAX,f,c}$" is reported in a concatenation manner in current technologies. In this embodiment of this application, a finer granularity (a reference signal resource set level) is considered. Therefore, a combination of "a plurality of PHs+one $P_{CMAX,f,c}$" is used to report the power headroom in a concatenation manner.

In addition, for meanings of other fields in FIG. 9, refer to meanings of corresponding fields in the PHR MAC CE shown in FIG. 1. Details are not described herein again.

It should be noted that, in this embodiment of this application, the power headroom included in the PH region may be characterized by a power headroom level. This is not limited in this embodiment of this application. This description is also applicable to other subsequent embodiments of this application. This is uniformly described herein, and details are not described below.

FIG. 10 provides an example illustration of the PHR MAC CE shown in FIG. 9, where:

The first row indicates that power headroom information of a PCell, a serving cell 1, and a serving cell 3 is reported in the PHR MAC CE, and the PCell is reported at a reference signal resource set level.

Each of two rows 2 to 7 respectively indicate whether the terminal device reports power headrooms of corresponding reference signal resource sets in the serving cell 1 and the serving cell 3 of the PCell, where a maximum configurable quantity of the reference signal resource sets is 16. In this example, for the PCell, the terminal device reports PHs of the reference signal resource set 0 and the reference signal resource set 1. For the serving cell 1, the terminal device reports the PH of the reference signal resource set 0. For the serving cell 3, the terminal device reports PHs of the reference signal resource set 0 and the reference signal resource set 1.

Rows 8 to 11 are reported according to a rule in current technologies, and details are not described herein again.

PHs of the reference signal resource set 0 and the reference signal resource set 1 in the PCell and maximum transmit power $P_{CMAX,f,c}$ 3 for sending the reference signal by the terminal device on the current carrier of the PCell are reported in rows 12 to 14.

The PH of the reference signal resource set 1 in the serving cell 1 and maximum transmit power $P_{CMAX,f,c}$ 4 at which the terminal device sends a reference signal on a current carrier of the serving cell 1 are reported in rows 15 to 16.

PHs of the reference signal resource set 0 and the reference signal resource set 1 in the serving cell 3 and maximum transmit power $P_{CMAX,f,c}$ 5 at which the terminal device sends a reference signal on a current carrier of the serving cell 1 are reported in rows 17 to 19.

It should be noted that, a structure of the PHR MAC CE shown in FIG. 9 or FIG. 10 is merely an example in which maximum ServCellIndex of a serving cell configured with an uplink is not greater than 8. Certainly, the maximum ServCellIndex of the serving cell configured with the uplink may be greater than 8. A structure principle of the PHR MAC CE when the maximum ServCellIndex of the serving cell configured with the uplink is greater than 8 is similar to the structure principle of the PHR MAC CE shown in FIG. 9. A difference lies in that the PHR MAC CE needs to be extended to more serving cells, and details are not described herein again.

It should be noted that, the serving cell n (n is greater than or equal to 1) in FIG. 9 or FIG. 10 is another serving cell other than the Pcell. This description is also applicable to another subsequent embodiment of this application. This is uniformly described herein, and details are not described below.

Scenario 2: The power headroom corresponding to the one or more reference signal resource sets is a power headroom of a first power headroom type, where the first power headroom type is a Type 3. That is, the scenario 2 reuses an existing Type 3 power headroom type. In addition, the one or more reference signal resource sets in each of the one or more cells that require the terminal device to report power headroom are indicated through the fourth indication information received by the terminal device, that is, the terminal device reports the power headroom at the reference signal resource set level as required.

Figure 11:
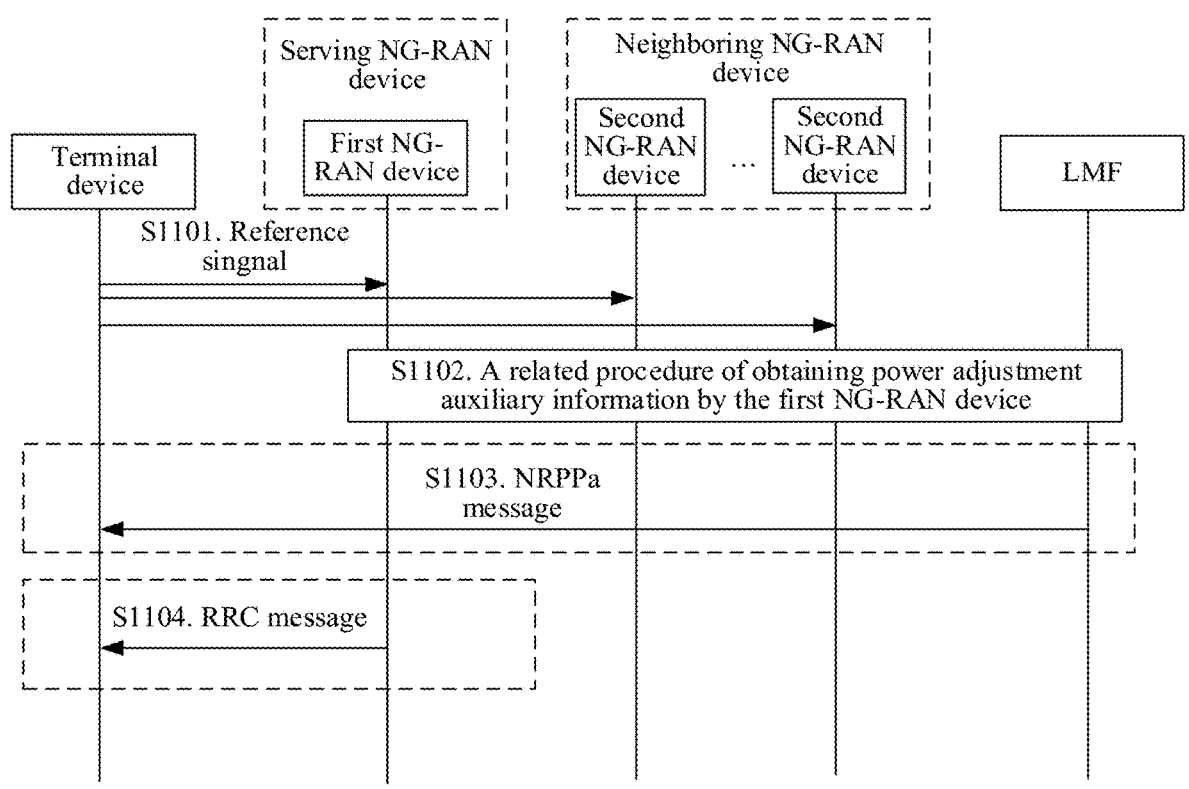
FIG. 11 is a schematic flowchart of obtaining fourth indication information according to an embodiment of this application.

A 5G communication system is used as an example. It is assumed that the network device is a first NG-RAN device. FIG. 11 shows a method of obtaining fourth indication information according to an embodiment of this application, including the following operations.

S1101. The terminal device sends a reference signal. Correspondingly, the NG-RAN device (including a first NG-RAN device and one or more participating second NG-RAN devices) participating in positioning of the terminal device receives a reference signal from the terminal device.

For example, in this embodiment of this application, the reference signal sent by the terminal device may include, for example, but is not limited to, a pos-SRS, an SRS, a demodulation reference signal (DMRS), a phase tracking reference signal (PTRS), or the like.

S1102. A related procedure of obtaining power adjustment auxiliary information by the first NG-RAN device.

For example, the second NG-RAN device may determine corresponding power adjustment auxiliary information after measuring the received reference signal, and send the power adjustment auxiliary information to the first NG-RAN device through an LMF. A procedure in which the first NG-RAN device obtains the power adjustment auxiliary information is not limited in this embodiment of this application.

Further, In a possible implementation, the terminal device may obtain the fourth indication information in the following operation S1103:

S1103. The LMF sends a first message to the terminal device. Correspondingly, the terminal device receives the first message from the LMF. The first message includes the fourth indication information.

For example, as shown in FIG. 11, in this embodiment of this application, the first message may be an LTE positioning protocol (LPP) message. Certainly, the first message may alternatively be another message. This is not limited in this embodiment of this application.

Alternatively, in another possible implementation, the terminal device may obtain the fourth indication information in the following operation S1104:

S1104. The first NG-RAN device sends a second message to the terminal device. Correspondingly, the terminal device receives the second message from the first NG-RAN device. The second message includes the fourth indication information.

For example, as shown in FIG. 11, in this embodiment of this application, the second message may be an RRC message. Certainly, the second message may alternatively be another message. This is not limited in this embodiment of this application.

In some embodiments, in this embodiment of this application, the fourth indication information may include an identifier of one or more cells and an identifier of one or more reference signal resource sets in each of the one or more cells.

Based on the foregoing solutions, the terminal device may obtain the fourth indication information. It should be understood that, in the schematic diagram of the connection relationship shown in FIG. 5 or FIG. 6, in the embodiment shown in FIG. 11, interaction between the LMF and the NG-RAN device (including a first MG-RAN device or a second NG-RAN device) needs to be transparently transmitted and forwarded by the AMF. Certainly, when there is a direct interface between the LMF and the NG-RAN device, the LMF and the NG-RAN device may also directly communicate with each other. This is not limited in this embodiment of this application.

In some embodiments, in scenario 2, the power headroom information may further include third indication information, where the third indication information indicates whether the terminal device reports a power headroom at a reference signal resource set level.

In this embodiment of this application, that the third indication information indicates whether the terminal device reports the power headroom at the reference signal resource set level may be understood as that the third indication information indicates whether the terminal device reports the power headroom at the reference signal resource set level of all serving cells of the terminal device. This is uniformly described herein, and details are not described below.

In some embodiments, in this scenario, the power headroom information may further include $P_{CMAX}$ corresponding to each of the one or more cells. $P_{CMAX}$ represents maximum transmit power at which the terminal device sends a reference signal on a current carrier of each of the one or more cells.

Certainly, in this embodiment of this application, the power headroom information further includes a Type 1 or Type 2 power headroom corresponding to each of the one or more cells. This is not limited in this embodiment of this application.

Figure 12:
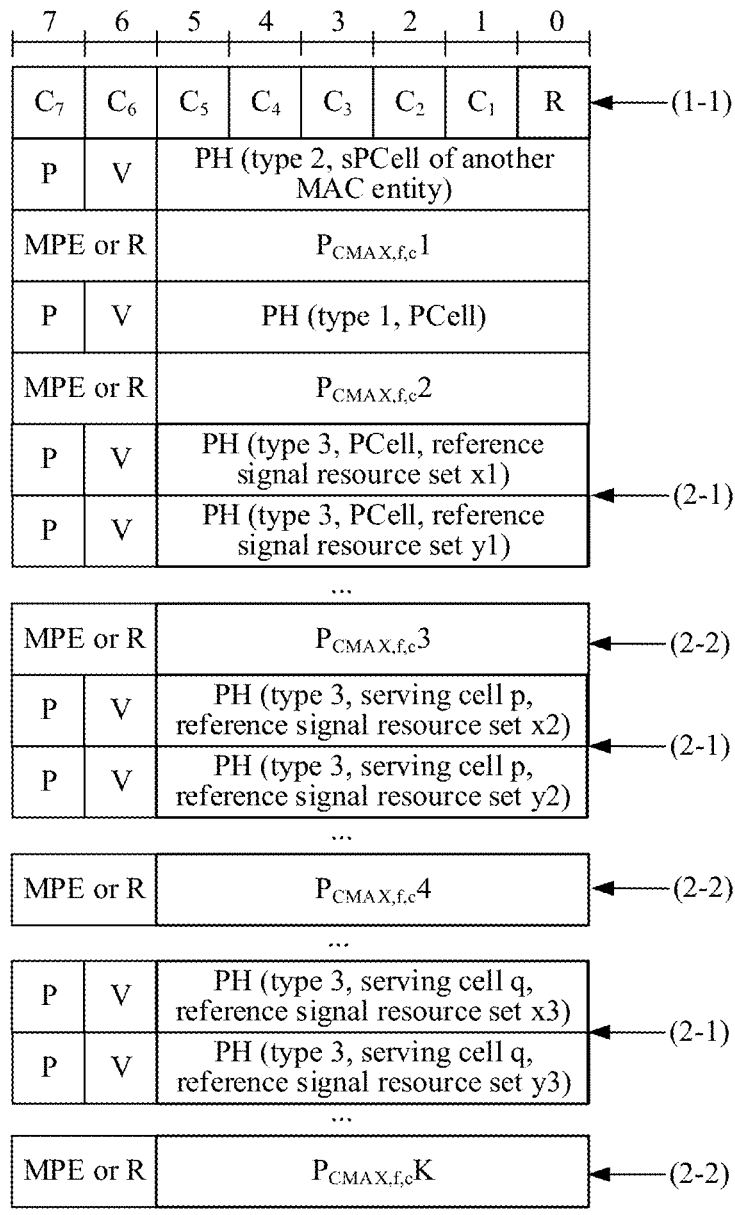
FIG. 12 is a schematic diagram 2 of a structure of a PHR MAC CE according to an embodiment of this application.

For example, when the maximum ServCellIndex of the serving cell for which the uplink is configured is not greater than 8, a schematic structural diagram of a PHR MAC CE provided in this embodiment of this application may be shown in FIG. 12. The foregoing third indication information may be represented by an R field in the (1-1) part in FIG. 12, and the foregoing power headroom may be represented by a PH region field in the (2-1) part in FIG. 12. The foregoing $P_{CMAX}$ may be represented by $P_{CMAX}$ region field in the (2-2) part in FIG. 12. The meanings of the fields in the PHR MAC CE are as follows:

(1-1): When the R field exists, the R field indicates whether the terminal device reports power headroom at reference signal resource set level of the serving cell whose $C_i$ field is 1 and the PCell. For example, R=0 indicates that the terminal device does not report the power headroom of the reference signal resource set level of the serving cell whose $C_i$ field is 1 and the PCell (it may also be understood that the terminal device reports a cell-level power headroom of the serving cell whose $C_i$ field is 1 and the PCell, or it may be understood that the serving cell whose $C_i$ field is 1 and the PCell report the power headroom at a cell level). R=1 indicates that the terminal device reports the power headroom of the reference signal resource set level of the serving cell whose $C_i$ field is 1 and the PCell (it may also be understood that the serving cell whose $C_i$ field is 1 and the PCell report the power headroom at the reference signal resource set level). Alternatively, R=1 indicates that the terminal device does not report the power headroom at the reference signal resource set level of the serving cell whose $C_i$ field is 1 and the PCell. R=0 indicates that the terminal device reports the power headroom at the reference signal resource set level of the serving cell whose $C_i$ field is 1 and the PCell. This is not limited in this embodiment of this application.

It should be noted that, in this embodiment of this application, the R field may exist or may not exist. The presence of the R field is applicable to scenarios where there are dynamic trigger conditions for PHR reporting at the cell level and reference signal resource set level. The absence of the R field may be understood as that the R field is a reserved bit, that is, which is consistent with current technologies. When the R field does not exist, the terminal device determines, based on the fourth indication information, the one or more reference signal resource sets in each of the one or more cells that require the terminal device to report the power headrooms. This is uniformly described herein, and details are not described below.

(2-1): The PH region includes the Type 3 power headroom of the one or more reference signal resource sets in each of the one or more cells that is indicated by the fourth indication information. FIG. 12 uses an example in which one or more reference signal resource sets in each of one or more cells include a reference signal resource set x1 and a reference signal resource set y1 in a PCell, a reference signal resource set x2 and a reference signal resource set y2 in a serving cell p, a reference signal resource set x3 and a reference signal resource set y3 in a serving cell q, and the like for illustration.

(2-2): This $P_{CMAX}$ region represents maximum transmit power at which the terminal device sends a reference signal on a current carrier of the serving cell n. The serving cell n is a cell that is among one or more cells indicated by the fourth indication information. It should be noted that, for all reference signal resource sets of the serving cell n that require the terminal device to report a Type 3 power headroom, the same $P_{CMAX,f,c}$ is shared. In other words, in this embodiment of this application, $P_{CMAX,f,c}$ is at a cell level.

It can be known from the combination of (2-1) and (2-2), which is different from the manner in which a combination of "one PH+one PH $P_{CMAX,f,c}$" is reported in a concatenation manner in current technologies. In this embodiment of this application, a finer granularity (a reference signal resource set level) is considered. Therefore, a combination of "a plurality of PHs+one $P_{CMAX,f,c}$" is used to report the power headroom in a concatenation manner.

In addition, for meanings of other fields in FIG. 12, refer to meanings of corresponding fields in the PHR MAC CE shown in FIG. 1. Details are not described herein again.

It should be noted that, the PHR MAC CE structure shown in FIG. 12 is merely an example in which maximum ServCellIndex of a serving cell configured with an uplink is not greater than 8. Certainly, the maximum ServCellIndex of the serving cell configured with the uplink may be greater than 8. A structure principle of the PHR MAC CE when the maximum ServCellIndex of the serving cell configured with the uplink is greater than 8 is similar to the structure principle of the PHR MAC CE shown in FIG. 12. A difference lies in that the PHR MAC CE needs to be extended to more serving cells, and details are not described herein again.

Scenario 3: The power headroom corresponding to the one or more reference signal resource sets is a power headroom of a second power headroom type, where the second power headroom type is a power headroom type at a reference signal resource set level. That is, a new power headroom type (assumed to be a Type4) is defined in the scenario 3. In addition, the power headroom information further includes second indication information, where the second indication information indicates whether the power headroom information includes the power headroom corresponding to each reference signal resource set in each of the one or more cells.

It should be noted that, in this embodiment of this application, that the second power headroom type is a power headroom type at a reference signal resource set level may also be understood as that the second power headroom type corresponds to a reference signal resource set in a serving cell, or that the second power headroom type is related to a reference signal resource set in a serving cell. This is uniformly described herein, and details are not described below.

In some embodiments, in this scenario, the power headroom information may further include first indication information, where the first indication information indicates whether the terminal device reports a power headroom at a reference signal resource set level of the first cell, and the first cell is a cell used by the terminal device to initiate initial access. For example, the first cell is a serving cell of the terminal device used by the terminal device to initiate initial access, for example, a PCell.

In some embodiments, in this scenario, the power headroom information may further include $P_{CMAX}$ corresponding to each of the one or more cells. $P_{CMAX}$ represents maximum transmit power at which the terminal device sends a reference signal on a current carrier of each of the one or more cells.

In some embodiments, in this scenario, the power headroom information further includes a power headroom corresponding to each of the one or more cells, and the power headroom corresponding to each of the one or more cells is a power headroom of a first power headroom type. The first power headroom type is a Type 3.

Certainly, in this embodiment of this application, the power headroom information further includes a Type 1 or Type 2 power headroom corresponding to each of the one or more cells. This is not limited in this embodiment of this application.

For example, the following that the first cell is a PCell and the terminal device is required to report the power headroom at the reference signal resource set level of the PCell is used as an example. When the maximum ServCellIndex of the serving cell configured with the uplink is not greater than 8, a schematic diagram of a structure of a PHR MAC CE according to an embodiment of this application may be shown in FIG. 13. The foregoing first indication information may be represented by an R field in a part (1-1) in FIG. 13, and the second indication information may be represented by a D area field in a part (1-2) in FIG. 13. The foregoing second-type power headroom may be represented by a PH region field in a part (2-1) and a part (3-1) in FIG. 13. The foregoing $P_{CMAX}$ may be represented by $P_{CMAX}$ region field in a part (2-2) and a part (3-2) in FIG. 13. The meanings of the fields in the PHR MAC CE are as follows:

(1-1): For related descriptions of the R field, refer to the embodiment shown in FIG. 9. Details are not described herein again.

(1-2): For related descriptions of the region D, refer to the embodiment shown in FIG. 9. Details are not described herein again.

(2-1): The PH region includes a power headroom of the Type 4 of all reference signal resource sets ($D_{0,m}=1$, m=0, 1, 2, . . . , 15) that are of the PCell and that are indicated in the D domain and that require the terminal device to report power headrooms.

(2-2): This $P_{CMAX}$ region indicates the maximum transmit power at which the terminal device sends a reference signal on a current carrier of the PCell. It should be noted that, for all reference signal resource sets of the PCell that require the terminal device to report a Type 4 power headroom, the same $P_{CMAX,f,c}$ is shared. In other words, in this embodiment of this application, $P_{CMAX,f,c}$ is at a cell level.

(3-1): The PH region includes Type4 power headrooms of all reference signal resource sets ($D_{n,m}=1$, m=0, 1, 2, . . . , 15) that are indicated in the D domain and that are of the serving cell n (n=p is used as an example) and that require the terminal device to report power headroom.

(3-2): This $P_{CMAX}$ region represents maximum transmit power at which the terminal device sends a reference signal on a current carrier of the serving cell n. It should be noted that, for all reference signal resource sets of the serving cell n that require the terminal device to report a Type 4 power headroom, the same $P_{CMAX,f,c}$ is shared. In other words, in this embodiment of this application, $P_{CMAX,f,c}$ is at a cell level.

It can be known from the combination of (2-1) and (2-2) or the combination of (3-1) and (3-2), which is different from the manner in which a combination of "one PH+one $P_{CMAX,f,c}$" is reported in a concatenation manner in current technologies. In this embodiment of this application, a finer granularity (a reference signal resource set level) is considered. Therefore, a combination of "a plurality of PHs+one $P_{CMAX,f,c}$" is used to report the power headroom in a concatenation manner.

Figure 13:
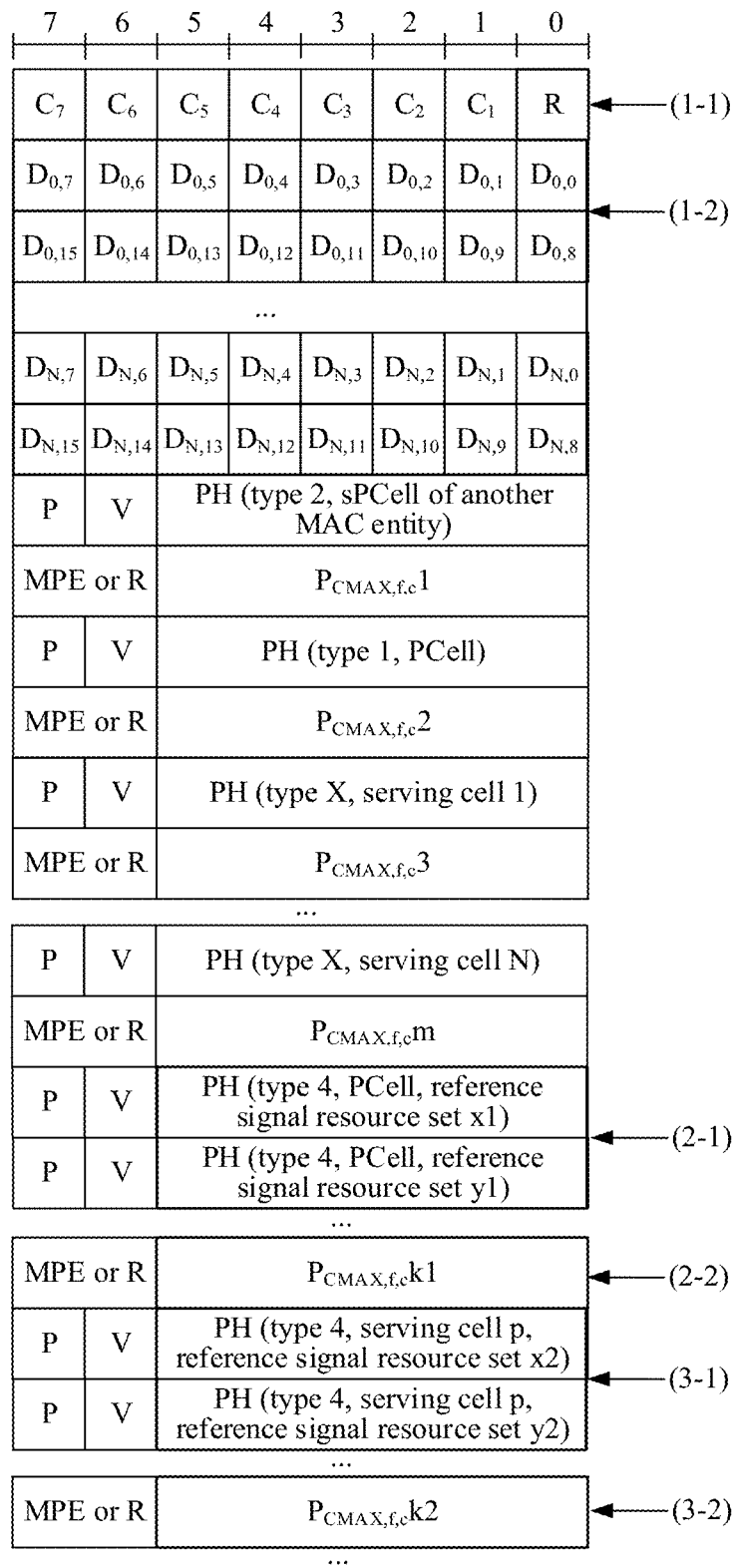
FIG. 13 is a schematic diagram 3 of a structure of a PHR MAC CE according to an embodiment of this application.

In addition, for meanings of other fields in FIG. 13, refer to meanings of corresponding fields in the PHR MAC CE shown in FIG. 1. Details are not described herein again.

It should be noted that, the PHR MAC CE structure shown in FIG. 13 is merely an example in which maximum ServCellIndex of a serving cell configured with an uplink is not greater than 8. Certainly, the maximum ServCellIndex of the serving cell configured with the uplink may be greater than 8. A structure principle of the PHR MAC CE when the maximum ServCellIndex of the serving cell configured with the uplink is greater than 8 is similar to the structure principle of the PHR MAC CE shown in FIG. 13. A difference lies in that the PHR MAC CE needs to be extended to more serving cells, and details are not described herein again.

Scenario 4: The power headroom corresponding to the one or more reference signal resource sets is a power headroom of a second power headroom type, where the second power headroom type is a power headroom type at a reference signal resource set level. That is, a new power headroom type (assumed to be a Type4) is defined in the scenario 4. In addition, the one or more reference signal resource sets in each of the one or more cells that require the terminal device to report power headroom are indicated through the fourth indication information received by the terminal device, that is, the terminal device reports the power headroom at the reference signal resource set level as required. For a manner of obtaining the fourth indication information, refer to the embodiment shown in FIG. 11. Details are not described herein again.

In some embodiments, in scenario 4, the power headroom information may further include third indication information. For related descriptions of the third indication information, refer to descriptions in scenario 2. Details are not described herein again.

In some embodiments, in this scenario, the power headroom information may further include $P_{CMAX}$ corresponding to each of the one or more cells. $P_{CMAX}$ represents maximum transmit power at which the terminal device sends a reference signal on a current carrier of each of the one or more cells.

In some embodiments, in this scenario, the power headroom information further includes a power headroom corresponding to each of the one or more cells, and the power headroom corresponding to each of the one or more cells is a power headroom of a first power headroom type. The first power headroom type is a Type 3.

Certainly, in this embodiment of this application, the power headroom information further includes a Type 1 or Type 2 power headroom corresponding to each of the one or more cells. This is not limited in this embodiment of this application.

Figure 14:
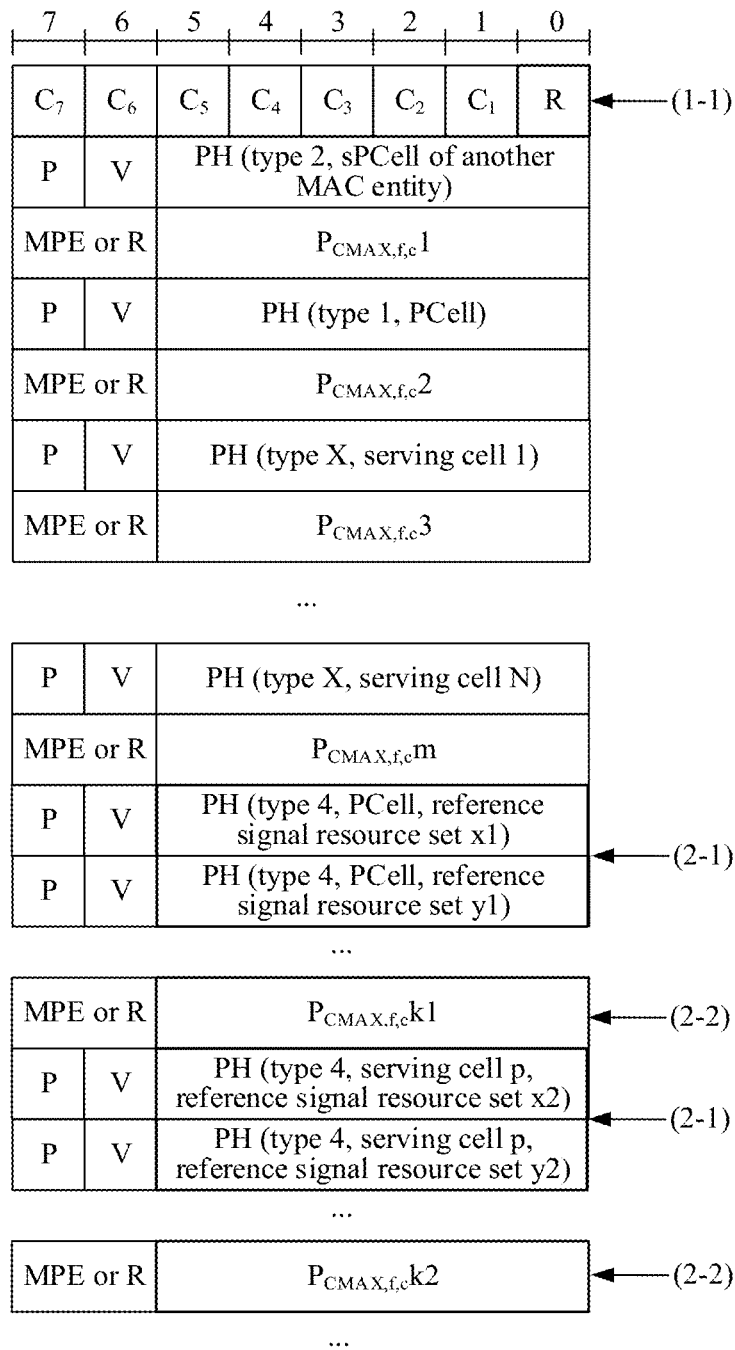
FIG. 14 is a schematic diagram 4 of a structure of a PHR MAC CE according to an embodiment of this application.

For example, when the maximum ServCellIndex of the serving cell configured with the uplink is not greater than 8, a schematic diagram of a structure of a PHR MAC CE provided in this embodiment of this application may be shown in FIG. 14. The foregoing third indication information may be represented by an R field in the (1-1) part in FIG. 14, and the second-type power headroom may be represented by a PH region field in the (2-1) part in FIG. 14. The foregoing $P_{CMAX}$ may be represented by $P_{CMAX}$ region field in the (2-2) part in FIG. 14. The meanings of the fields in the PHR MAC CE are as follows:

(1-1): For related descriptions of the R field, refer to the embodiment shown in FIG. 12. Details are not described herein again.

(2-1): The PH region includes the Type 4 power headroom of the one or more reference signal resource sets in each of the one or more cells that is indicated by the fourth indication information. FIG. 14 uses an example in which one or more reference signal resource sets in each of one or more cells include a reference signal resource set x1 and a reference signal resource set y1 in a PCell, a reference signal resource set x2 and a reference signal resource set y2 in a serving cell p, and the like for illustration.

(2-2): This $P_{CMAX}$ region represents maximum transmit power at which the terminal device sends a reference signal on a current carrier of the serving cell n. The serving cell n is a cell that is among one or more cells indicated by the fourth indication information. It should be noted that, for all reference signal resource sets of the serving cell n that require the terminal device to report a Type 4 power headroom, the same $P_{CMAX,f,c}$ is shared. In other words, in this embodiment of this application, $P_{CMAX,f,c}$ is at a cell level.

It can be known from the combination of (2-1) and (2-2), which is different from the manner in which a combination of "one PH+one PH $P_{CMAX,f,c}$" is reported in a concatenation manner in current technologies. In this embodiment of this application, a finer granularity (a reference signal resource set level) is considered. Therefore, a combination of "a plurality of PHs+one $P_{CMAX,f,c}$" is used to report the power headroom in a concatenation manner.

In addition, for meanings of other fields in FIG. 14, refer to meanings of corresponding fields in the PHR MAC CE shown in FIG. 1. Details are not described herein again.

It should be noted that, the PHR MAC CE structure shown in FIG. 14 is merely an example in which maximum ServCellIndex of a serving cell configured with an uplink is not greater than 8. Certainly, the maximum ServCellIndex of the serving cell configured with the uplink may be greater than 8. A structure principle of the PHR MAC CE when the maximum ServCellIndex of the serving cell configured with the uplink is greater than 8 is similar to the structure principle of the PHR MAC CE shown in FIG. 14. A difference lies in that the PHR MAC CE needs to be extended to more serving cells, and details are not described herein again.

It should be noted that, in both FIG. 13 and FIG. 14, an example in which the power headroom information includes a Type 1/2/3 power headroom corresponding to each of one or more cells is used for illustration. Certainly, the power headroom information provided in this embodiment of this application may not include the Type 1/2/3 power headroom corresponding to each of the one or more cells. This is not limited in this embodiment of this application.

Based on the power headroom reporting method provided in this embodiment of this application, power headroom information sent by the terminal device to the network device includes a power headroom corresponding to one or more reference signal resource sets in each of one or more cells. It can be concluded that the power headroom reported by the terminal device to the network device includes a power headroom at a reference signal resource set level. However, in a current standard related to uplink power, the calculation of the Type 3 power headroom is at a reference signal resource set level. Therefore, a reporting level of the power headroom provided in embodiments of this application matches a calculation level the Type 3 power headroom. Therefore, a problem in current technologies that the calculation level of the Type 3 power headroom does not match the reporting level of the Type 3 power headroom can be avoided.

The actions of the network device in operations S801 to S803 may be executed by the processor 501 in the network device 50 shown in FIG. 6 by invoking the application program code stored in the memory 502. The actions of the terminal device in operations S801 to S803 may be performed by the processor 401 in the terminal device 40 shown in FIG. 6 by invoking the application program code stored in the memory 402.

It may be understood that, in the foregoing embodiments, the method and/or the operations implemented by the terminal device may alternatively be implemented by a component (for example, a chip or a circuit) that can be used for the terminal device. The method and/or operation implemented by the network device may alternatively be implemented by a component (for example, a chip or a circuit) that can be used for the network device.

The foregoing mainly describes the solutions provided in embodiments of this application from a perspective of interaction between the network elements. Correspondingly, this embodiment of this application further provides a communication apparatus. The communication apparatus is configured to implement the foregoing methods. The communication apparatus may be the terminal device in the foregoing method embodiment, or an apparatus including the foregoing terminal device, or a component that can be used for the terminal device. Alternatively, the communication apparatus may be the network device in the foregoing method embodiment, or an apparatus including the foregoing network device, or a component that can be used for the network device. It may be understood that, to implement the foregoing functions, the communication apparatus includes a hardware structure and/or a software module for performing a corresponding function. A person skilled in the art should be easily aware that, the units and algorithm operations in the examples described with reference to embodiments disclosed in this specification can be implemented in a form of hardware or a combination of hardware and computer software in this application. Whether a function is performed by hardware or hardware driven by computer software depends on particular applications and design constraints of the technical solutions. A person skilled in the art may use different methods to implement the described functions of each particular application, but it should not be considered that the implementation goes beyond the scope of this application.

In embodiments of this application, the communication apparatus may be divided into functional modules based on the foregoing method embodiment. For example, each functional module may be obtained through division based on each corresponding function, or two or more functions may be integrated into one processing module. The integrated module may be implemented in a form of hardware, or may be implemented in a form of a software function module. It should be noted that, the module division in embodiments of this application is an example, and is merely logical function division. There may be another division manner in an actual implementation.

Figure 15:
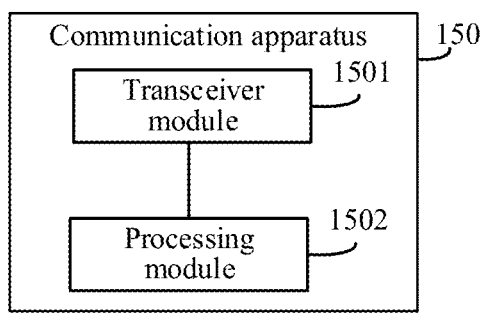
FIG. 15 is a schematic diagram of a structure of another communication apparatus according to an embodiment of this application.

FIG. 15 is a schematic diagram of a structure of a communication apparatus 150. The communication apparatus 150 includes a transceiver module 1501 and a processing module 1502. The transceiver module 1501 may also be referred to as a transceiver unit, and is configured to implement a transceiver function. For example, the transceiver module may be a transceiver circuit, a transceiver machine, a transceiver, or a communication interface.

That the communication apparatus 150 is the terminal device in the foregoing method embodiment is used as an example, and then:

The processing module 1502 is configured to determine power headroom corresponding to one or more reference signal resource sets in each of one or more cells, where the one or more cells are cells that are among cells participating in positioning of the terminal device and that require the terminal device to report the power headroom. The transceiver module 1501 is configured to send power headroom information to a network device, where the power headroom information includes the power headroom corresponding to the one or more reference signal resource sets in each of the one or more cells.

In some embodiments, the power headroom information further includes first indication information, where the first indication information indicates whether the terminal device reports a power headroom at a reference signal resource set level of the first cell, and the first cell is a cell used by the terminal device to initiate initial access.

In some embodiments, the power headroom information further includes second indication information, where the second indication information indicates whether the power headroom information includes the power headroom corresponding to each reference signal resource set in each of the one or more cells.

In some embodiments, the power headroom information further includes third indication information, where the third indication information indicates whether the terminal device reports a power headroom at a reference signal resource set level.

In some embodiments, the transceiver module 1501 is further configured to receive fourth indication information, where the fourth indication information indicates the one or more reference signal resource sets in each of the one or more cells that require the terminal device to report the power headrooms.

In some embodiments, the fourth indication information includes an identifier of one or more cells and an identifier of one or more reference signal resource sets in each of the one or more cells.

In some embodiments, that the transceiver module 1501 is configured to receive the fourth indication information includes: the transceiver module is configured to receive the fourth indication information from a positioning management device or a network device.

In some embodiments, the power headroom corresponding to the one or more reference signal resource sets is a power headroom of a first power headroom type, where the first power headroom type is a Type 3.

In some embodiments, the power headroom corresponding to the one or more reference signal resource sets is a power headroom of a second power headroom type, where the second power headroom type is a power headroom type at a reference signal resource set level.

In some embodiments, the power headroom information further includes a power headroom corresponding to each of the one or more cells, where the power headroom corresponding to each of the one or more cells is a power headroom of a first power headroom type, and the first power headroom type is a Type 3.

In some embodiments, the power headroom information further includes $P_{CMAX}$ corresponding to each of the one or more cells. $P_{CMAX}$ represents maximum transmit power at which the terminal device sends a reference signal on a current carrier of each of the one or more cells.

In some embodiments, that the transceiver module 1501 is configured to send the power headroom information to the network device includes: the transceiver module is configured to send a MAC CE to the network device, where the MAC CE includes power headroom information, and the power headroom information includes the power headroom corresponding to the one or more reference signal resource sets in each of the one or more cells.

All related content of the operations in the foregoing method embodiment may be cited in function descriptions of a corresponding functional module. Details are not described herein again.

In this embodiment, the communication apparatus 150 is presented in a form in which functional modules are divided in an integrated manner. The "module" herein may be an ASIC, a circuit, a processor that executes one or more software or firmware programs, a memory, an integrated logic circuit, and/or another device that can provide the foregoing function.

For example, the processor 401 in the terminal device 40 shown in FIG. 6 may invoke the computer executable instruction stored in the memory 402, so that the terminal device 40 performs the power headroom reporting method in the foregoing method embodiment.

A function/implementation process of the transceiver module 1501 and the processing module 1502 in FIG. 15 may be implemented by the processor 401 in the terminal device 40 shown in FIG. 6 by invoking the computer executable instruction stored in the memory 402. Alternatively, a function/implementation process of the processing module 1502 in FIG. 15 may be implemented by the processor 401 in the terminal device 40 shown in FIG. 6 by invoking the computer executable instruction stored in the memory 402. A function/implementation process of the transceiver module 1501 in FIG. 15 may be implemented by the transceiver 403 in the terminal device 40 shown in FIG. 6.

Because the communication apparatus 150 provided in this embodiment may perform the power headroom reporting method in the foregoing method embodiment, for technical effects that can be obtained by the communication apparatus, refer to the foregoing method embodiment. Details are not described herein again.

That the communication apparatus 150 is the network device in the foregoing method embodiment is used as an example, and then:

The transceiver module 1501 is configured to receive power headroom information from the terminal device, where the power headroom information includes power headroom corresponding to one or more reference signal resource sets in each of one or more cells. The one or more cells are cells that are among cells participating in positioning of the terminal device and that require the terminal device to report the power headroom. The processing module 1502 is configured to determine an adjustment value of uplink transmit power of the terminal device based on the power headroom information.

In some embodiments, the power headroom information further includes first indication information, where the first indication information indicates whether the terminal device reports a power headroom at a reference signal resource set level of the first cell, and the first cell is a cell used by the terminal device to initiate initial access.

In some embodiments, the power headroom information further includes second indication information, where the second indication information indicates whether the power headroom information includes the power headroom corresponding to each reference signal resource set in each of the one or more cells.

In some embodiments, the power headroom information further includes third indication information, where the third indication information indicates whether the terminal device reports a power headroom at a reference signal resource set level.

In some embodiments, the transceiver module 1501 is further configured to send fourth indication information to the terminal device, where the fourth indication information indicates the one or more reference signal resource sets in each of the one or more cells that require the terminal device to report the power headrooms.

In some embodiments, the fourth indication information includes an identifier of one or more cells and an identifier of one or more reference signal resource sets in each of the one or more cells.

In some embodiments, the power headroom corresponding to the one or more reference signal resource sets is a power headroom of a first power headroom type, where the first power headroom type is a Type 3.

In some embodiments, the power headroom corresponding to the one or more reference signal resource sets is a power headroom of a second power headroom type, where the second power headroom type is a power headroom type at a reference signal resource set level.

In some embodiments, the power headroom information further includes a power headroom corresponding to each of the one or more cells, where the power headroom corresponding to each of the one or more cells is a power headroom of a first power headroom type, and the first power headroom type is a Type 3.

In some embodiments, the power headroom information further includes $P_{CMAX}$ corresponding to each of the one or more cells. $P_{CMAX}$ represents maximum transmit power at which the terminal device sends a reference signal on a current carrier of each of the one or more cells.

In some embodiments, that the transceiver module 1501 is configured to receive power headroom information from the terminal device includes: the transceiver module is configured to receive a MAC CE from the terminal device, where the MAC CE includes power headroom information, and the power headroom information includes the power headroom corresponding to the one or more reference signal resource sets in each of the one or more cells.

All related content of the operations in the foregoing method embodiment may be cited in function descriptions of a corresponding functional module. Details are not described herein again.

In this embodiment, the communication apparatus 150 is presented in a form in which functional modules are divided in an integrated manner. The "module" herein may be an ASIC, a circuit, a processor that executes one or more software or firmware programs, a memory, an integrated logic circuit, and/or another device that can provide the foregoing function.

For example, the processor 501 in the network device 50 shown in FIG. 6 may invoke the computer executable instruction stored in the memory 502, so that the network device 50 performs the power headroom reporting method in the foregoing method embodiment.

A function/implementation process of the transceiver module 1501 and the processing module 1502 in FIG. 15 may be implemented by the processor 501 in the network device 50 shown in FIG. 6 by invoking the computer executable instruction stored in the memory 502. Alternatively, a function/implementation process of the processing module 1502 in FIG. 15 may be implemented by the processor 501 in the network device 50 shown in FIG. 6 by invoking the computer executable instruction stored in the memory 502. A function/implementation process of the transceiver module 1501 in FIG. 15 may be implemented by the transceiver 503 in the network device 50 shown in FIG. 6.

Because the communication apparatus 150 provided in this embodiment may perform the power headroom reporting method in the foregoing method embodiment, for technical effects that can be obtained by the communication apparatus, refer to the foregoing method embodiment. Details are not described herein again.

Figure 16:
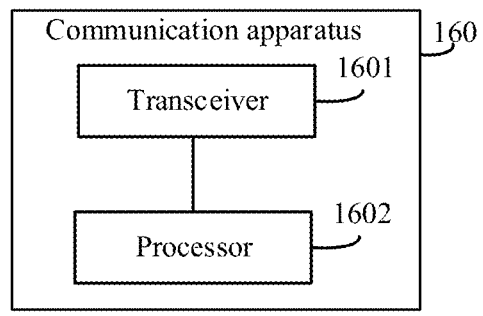
FIG. 16 is a schematic diagram of a structure of another communication apparatus according to an embodiment of this application.

FIG. 16 is a schematic diagram of a structure of still another communication apparatus 160. The communication apparatus 160 includes a transceiver 1601 and a processor 1602.

That the communication apparatus 160 is the terminal device in the foregoing method embodiment is used as an example, and then:

The processor 1602 is configured to determine power headroom corresponding to one or more reference signal resource sets in each of one or more cells, where the one or more cells are cells that are among cells participating in positioning of the terminal device and that require the terminal device to report the power headroom. The transceiver 1601 is configured to send power headroom information to a network device, where the power headroom information includes the power headroom corresponding to the one or more reference signal resource sets in each of the one or more cells.

In some embodiments, the power headroom information further includes first indication information, where the first indication information indicates whether the terminal device reports a power headroom at a reference signal resource set level of the first cell, and the first cell is a cell used by the terminal device to initiate initial access.

In some embodiments, the power headroom information further includes second indication information, where the second indication information indicates whether the power headroom information includes the power headroom corresponding to each reference signal resource set in each of the one or more cells.

In some embodiments, the power headroom information further includes third indication information, where the third indication information indicates whether the terminal device reports a power headroom at a reference signal resource set level.

In some embodiments, the transceiver 1601 is further configured to receive fourth indication information, where the fourth indication information indicates the one or more reference signal resource sets in each of the one or more cells that require the terminal device to report the power headrooms.

In some embodiments, the fourth indication information includes an identifier of one or more cells and an identifier of one or more reference signal resource sets in each of the one or more cells.

In some embodiments, that the transceiver 1601 is configured to receive the fourth indication information includes: the transceiver module is configured to receive the fourth indication information from a positioning management device or a network device.

In some embodiments, the power headroom corresponding to the one or more reference signal resource sets is a power headroom of a first power headroom type, where the first power headroom type is a Type 3.

In some embodiments, the power headroom corresponding to the one or more reference signal resource sets is a power headroom of a second power headroom type, where the second power headroom type is a power headroom type at a reference signal resource set level.

In some embodiments, the power headroom information further includes a power headroom corresponding to each of the one or more cells, where the power headroom corresponding to each of the one or more cells is a power headroom of a first power headroom type, and the first power headroom type is a Type 3.

In some embodiments, the power headroom information further includes $P_{CMAX}$ corresponding to each of the one or more cells. $P_{CMAX}$ represents maximum transmit power at which the terminal device sends a reference signal on a current carrier of each of the one or more cells.

In some embodiments, that the transceiver 1601 is configured to send the power headroom information to the network device includes: the transceiver module is configured to send a MAC CE to the network device, where the MAC CE includes power headroom information, and the power headroom information includes the power headroom corresponding to the one or more reference signal resource sets in each of the one or more cells.

That the communication apparatus 160 is the network device in the foregoing method embodiment is used as an example, and then:

The transceiver 1601 is configured to receive power headroom information from the terminal device, where the power headroom information includes power headroom corresponding to one or more reference signal resource sets in each of one or more cells. The one or more cells are cells that are among cells participating in positioning of the terminal device and that require the terminal device to report the power headroom. The processor 1602 is configured to determine an adjustment value of uplink transmit power of the terminal device based on the power headroom information.

In some embodiments, the power headroom information further includes first indication information, where the first indication information indicates whether the terminal device reports a power headroom at a reference signal resource set level of the first cell, and the first cell is a cell used by the terminal device to initiate initial access.

In some embodiments, the power headroom information further includes second indication information, where the second indication information indicates whether the power headroom information includes the power headroom corresponding to each reference signal resource set in each of the one or more cells.

In some embodiments, the power headroom information further includes third indication information, where the third indication information indicates whether the terminal device reports a power headroom at a reference signal resource set level.

In some embodiments, the transceiver 1601 is further configured to send fourth indication information to the terminal device, where the fourth indication information indicates the one or more reference signal resource sets in each of the one or more cells that require the terminal device to report the power headrooms.

In some embodiments, the fourth indication information includes an identifier of one or more cells and an identifier of one or more reference signal resource sets in each of the one or more cells.

In some embodiments, the power headroom corresponding to the one or more reference signal resource sets is a power headroom of a first power headroom type, where the first power headroom type is a Type 3.

In some embodiments, the power headroom corresponding to the one or more reference signal resource sets is a power headroom of a second power headroom type, where the second power headroom type is a power headroom type at a reference signal resource set level.

In some embodiments, the power headroom information further includes a power headroom corresponding to each of the one or more cells, where the power headroom corresponding to each of the one or more cells is a power headroom of a first power headroom type, and the first power headroom type is a Type 3.

In some embodiments, the power headroom information further includes $P_{CMAX}$ corresponding to each of the one or more cells. $P_{CMAX}$ represents maximum transmit power at which the terminal device sends a reference signal on a current carrier of each of the one or more cells.

In some embodiments, that the transceiver 1601 is configured to receive the power headroom information from the terminal device includes: the transceiver is configured to receive a MAC CE from the terminal device, where the MAC CE includes power headroom information, and the power headroom information includes the power headroom corresponding to the one or more reference signal resource sets in each of the one or more cells.

All related content of the operations in the foregoing method embodiment may be cited in function descriptions of a corresponding functional module. Details are not described herein again.

Because the communication apparatus 160 provided in this embodiment may perform the power headroom reporting method in the foregoing method embodiment, for technical effects that can be obtained by the communication apparatus, refer to the foregoing method embodiment. Details are not described herein again.

In some embodiments, this embodiment of this application further provides a chip system, including: at least one processor and an interface, where the at least one processor is coupled to a memory through the interface, and when the at least one processor executes a computer program or instructions in the memory, the method in any one of the foregoing method embodiment is performed. In some embodiments, the chip system may include a chip, or may include a chip and another discrete component. This is not limited in this embodiment of this application.

It should be noted that, one or more of the foregoing modules or units may be implemented by using software, hardware, or a combination thereof. When any one of the foregoing modules or units is implemented by using software, the software exists in a form of a computer program instruction, and is stored in the memory. The processor may be configured to execute the program instruction to implement the foregoing method procedures. The processor may be built into a system on chip (SoC) or an ASIC, or may be a standalone semiconductor chip. In addition to the core configured to perform calculation or processing by executing a software instruction, the processor may further include hardware accelerator, for example, a field programmable gate array (FPGA), a PLD (programmable logic device), or a logic circuit that implements a dedicated logic operation.

When the foregoing modules or units are implemented by using hardware, the hardware may be any one of or any combination of a CPU, a microprocessor, a digital signal processing (DSP) chip, a microcontroller unit (MCU), an artificial intelligence processor, an ASIC, or an SoC, an FPGA, a PLD, a dedicated digital circuit, a hardware accelerator, or a non-integrated discrete device, and may run software or not depend on software to perform the foregoing method procedures.

All or a part of the foregoing embodiments may be implemented by software, hardware, firmware, or any combination thereof. When a software program is used to implement embodiments, all or a part of embodiments may be implemented in a form of a computer program product. The computer program product includes one or more computer instructions. When the computer program instructions are loaded and executed on a computer, the procedures or functions according to embodiments of this application are all or partially generated. The computer may be a general-purpose computer, a dedicated computer, a computer network, or any other programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state drive (SSD)), or the like.

Although this application is described with reference to embodiments, in a process of implementing this application that claims protection, a person skilled in the art may understand and implement another variation of the disclosed embodiments by viewing the accompanying drawings, disclosed content, and appended claims. In the claims, the term "include" (comprising) does not exclude another component or another operation, and "a" or "one" does not exclude a case of plurality. A single processor or another unit may implement several functions enumerated in the claims. Some measures are recorded in dependent claims that are different from each other, but this does not indicate that these measures cannot be combined to produce a better effect.

Although this application has been described with reference to features and embodiments thereof, it is obvious that various modifications and combinations may be made to this application without departing from the spirit and scope of this application. Correspondingly, the specification and the accompanying drawings are merely example descriptions of this application defined by the following claims, and are deemed to have covered any and all modifications, variations, combinations, or equivalents that fall within the scope of this application. It is clear that a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A power headroom reporting method, wherein the method comprises:
   determining a power headroom corresponding to one or more reference signal resource sets in each of one or more cells, wherein the one or more cells are cells that are among cells participating in positioning of a terminal device and that require the terminal device to report the power headroom; and
   sending power headroom information to a network device, wherein the power headroom information comprises the power headroom corresponding to the one or more reference signal resource sets in each of the one or more cells, wherein the power headroom information further comprises first indication information that indicates whether the terminal device reports a power headroom at a reference signal resource set level of a first cell that is a cell used by the terminal device to initiate initial access; or the power headroom information further comprises third indication information that indicates whether the terminal device reports a power headroom at a reference signal resource set level.

2. The method according to claim 1, wherein the power headroom information further comprises second indication information that indicates whether the power headroom information comprises the power headroom corresponding to each reference signal resource set in each of the one or more cells.

3. The method according to claim 1, wherein the method further comprises:

receiving fourth indication information that indicates the one or more reference signal resource sets in each of the one or more cells that require the terminal device to report the power headroom.

4. The method according to claim 3, wherein the fourth indication information comprises an identifier of the one or more cells and an identifier of the one or more reference signal resource sets in each of the one or more cells.

5. The method according to claim 3, wherein the receiving of the fourth indication information comprises:

receiving the fourth indication information from a positioning management device or the network device.

6. The method according to claim 1, wherein the power headroom corresponding to the one or more reference signal resource sets is a power headroom of a first power headroom type; and the first power headroom type is a Type 3.

7. The method according to claim 1, wherein the power headroom corresponding to the one or more reference signal resource sets is a power headroom of a second power headroom type; and the second power headroom type is a power headroom type at the reference signal resource set level.

8. The method according to claim 7, wherein the power headroom information further comprises the power headroom corresponding to each of the one or more cells;

the power headroom corresponding to each of the one or more cells is a power headroom of a first power headroom type; and the first power headroom type is a Type 3.

9. The method according to claim 1, wherein the power headroom information further comprises $P_{CMAX}$ corresponding to each of the one or more cells; and $P_{CMAX}$ represents maximum transmit power at which the terminal device sends a reference signal on a current carrier of each of the one or more cells.

10. The method according to claim 1, wherein the sending power headroom information to the network device comprises:

sending a medium access control (MAC) control element (CE) to the network device, wherein the MAC CE comprises the power headroom information, and the power headroom information comprises the power headroom corresponding to the one or more reference signal resource sets in each of the one or more cells.

11. A communication apparatus, comprising:
a processing device; and a memory to store instructions that, when executed by the processing device, cause the processing device to:

determine power headroom corresponding to one or more reference signal resource sets in each of one or more cells, wherein the one or more cells are cells that are among cells participating in positioning of a terminal device and that require the terminal device to report the power headroom; and send power headroom information to a network device, wherein the power headroom information comprises the power headroom corresponding to the one or more reference signal resource sets in each of the one or more cells, wherein the power headroom information further comprises first indication information that indicates whether the terminal device reports a power headroom at a reference signal resource set level of a first cell that is a cell used by the terminal device to initiate initial access; or the power headroom information further comprises third indication information that indicates whether the terminal device reports a power headroom at a reference signal resource set level.

12. The communication apparatus according to claim 11, wherein the power headroom information further comprises second indication information that indicates whether the power headroom information comprises the power headroom corresponding to each reference signal resource set in each of the one or more cells.

13. The communication apparatus according to claim 11, wherein the processing device is further to:

receive fourth indication information that indicates the one or more reference signal resource sets in each of the one or more cells that require the terminal device to report the power headroom.

14. The communication apparatus according to claim 13, wherein the fourth indication information comprises an identifier of the one or more cells and an identifier of the one or more reference signal resource sets in each of the one or more cells.

15. The communication apparatus according to claim 13, wherein the fourth indication information is received from a positioning management device or the network device.

16. A communication system, comprising:

a terminal device configured to:

determine power headroom corresponding to one or more reference signal resource sets in each of one or more cells; and send power headroom information to a network device, wherein the one or more cells are cells that are among cells participating in positioning of the terminal device and that require the terminal device to report the power headroom, and the power headroom information comprises the power headroom corresponding to the one or more reference signal resource sets in each of the one or more cells, wherein the power headroom information further comprises first indication information that indicates whether the terminal device reports a power headroom at a reference signal resource set level of a first cell that is a cell used by the terminal device to initiate initial access; or the power headroom information further comprises third indication information that indicates whether the terminal device reports a power headroom at a reference signal resource set level; and the network device configured to:
receive the power headroom information from the terminal device, and determine an adjustment value of uplink transmit power of the terminal device based on the power headroom information.

17. The communication system according to claim 16, wherein the power headroom information further comprises second indication information that indicates whether the power headroom information comprises the power headroom corresponding to each reference signal resource set in each of the one or more cells.

18. The communication system according to claim 16, wherein the terminal device is further to:
receive fourth indication information that indicates the one or more reference signal resource sets in each of the one or more cells that require the terminal device to report the power headroom.

19. The communication system according to claim 18, wherein the fourth indication information comprises an identifier of the one or more cells and an identifier of the one or more reference signal resource sets in each of the one or more cells.

20. The communication system according to claim 18, wherein the terminal device receives the fourth indication information from a positioning management device or the network device.

* * * * *